United States Patent [19]

Routery

[11] Patent Number: 5,142,853
[45] Date of Patent: Sep. 1, 1992

[54] TOOL DRIVE ASSEMBLY AND RELATED TOOL DRIVE LINKAGE, TOOL WORK IMPLEMENT ASSEMBLY AND TOOL

[76] Inventor: Edward E. Routery, 2900 W. Highland, Chandler, Ariz. 85226

[21] Appl. No.: 540,539

[22] Filed: Jun. 19, 1990

[51] Int. Cl.⁵ .................. A01D 34/68; A01D 34/76
[52] U.S. Cl. ........................... 56/242; 56/255; 56/295; 56/DIG. 6
[58] Field of Search .............. 56/239, 240, 241, 242, 56/12.7, 255, 295, DIG. 6, DIG. 20; 172/40, 41, 42; 173/19, 50, 51

[56] References Cited

U.S. PATENT DOCUMENTS

| | | | |
|---|---|---|---|
| 4,087,982 | 5/1978 | Golobay | 172/40 |
| 4,351,396 | 9/1982 | Moulton | 172/40 |
| 4,541,492 | 9/1985 | Motruk | 172/41 |
| 4,881,363 | 11/1989 | Terai et al. | 56/255 |
| 4,911,247 | 3/1990 | Kühlmann et al. | 56/255 |

OTHER PUBLICATIONS

*Power Equipment Trade Magazine*, Jan. 1989, pp. 28–31.
*Screws—A Systematic Approach to Maximizing Profits from Extrusion, Blow Molding and Injection Molding Machinery*, a publication of Davis–Standard, a Division of Crompton & Knowles Corporation.
*The Green Machine, Assembly and Operating Instructions* for Models including 2370 Cultivator and 2371 Cultivator, a publication of HMC.
*The Green Machine Assembly and Operating Instructions* for the model 3371 Cultivator attachment, a publication of HMC.

*Primary Examiner*—Terry L. Melius
*Attorney, Agent, or Firm*—Nilsson, Robbins, Dalgarn, Berliner, Carson & Wurst

[57] ABSTRACT

A landscape care tool can take the form of a vegetation-cutting tool incorporating circular-shaped blades having teeth or an earth-working tool incorporating hoeing tines. Drive linkage for such tool forms, as well as other tool forms, imparts linear movement in response to rotation of a shaft. The drive linkage includes a worm element which rotates with the shaft and a tooth carrier which moves linearly in response to rotation of the worm element. The worm element has one set of threads angled in one direction and a second set of threads angled in the opposite direction. The tooth carrier carries one tooth which engages threads of the first set of threads in order to move the carrier in one linear direction and a second tooth which engages threads of the second set of threads to move the carrier in the opposite linear direction. Variations in such characteristics as thread pitch spacing and pitch angle can be readily employed to substantially vary the characteristics of a drive assembly incorporating the linkage.

23 Claims, 12 Drawing Sheets

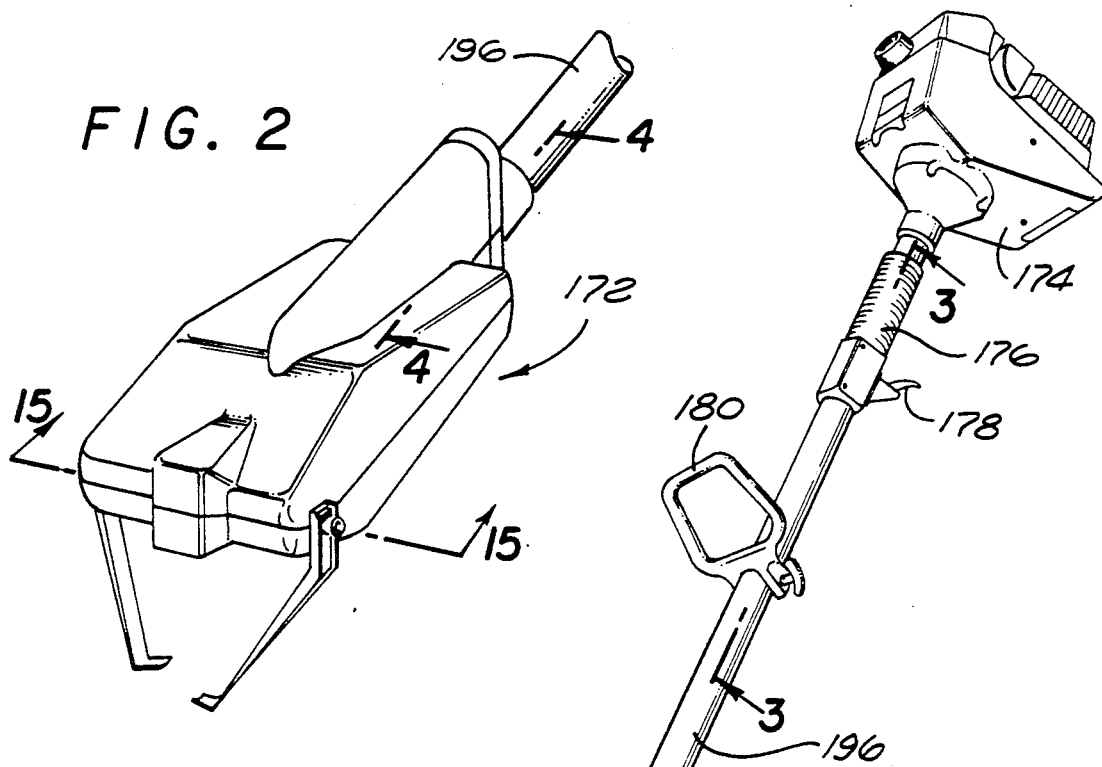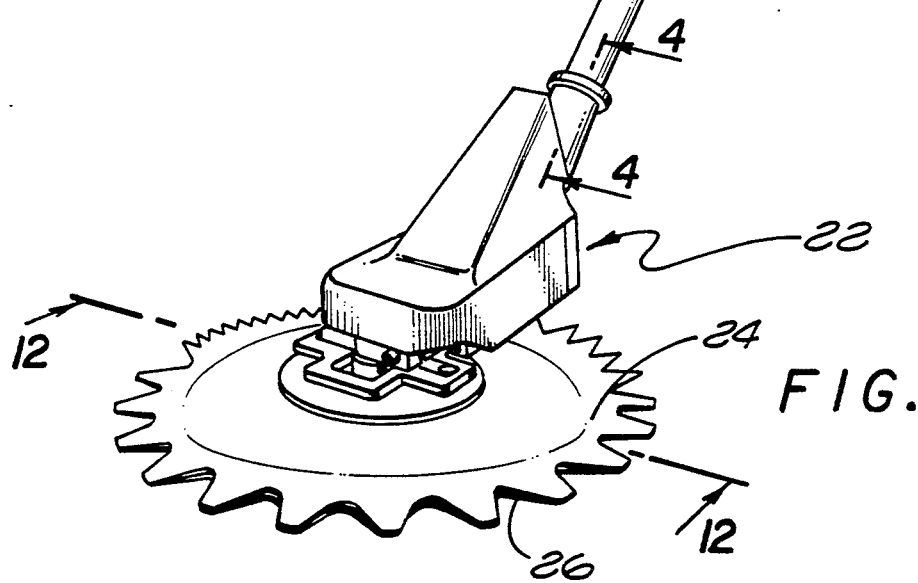

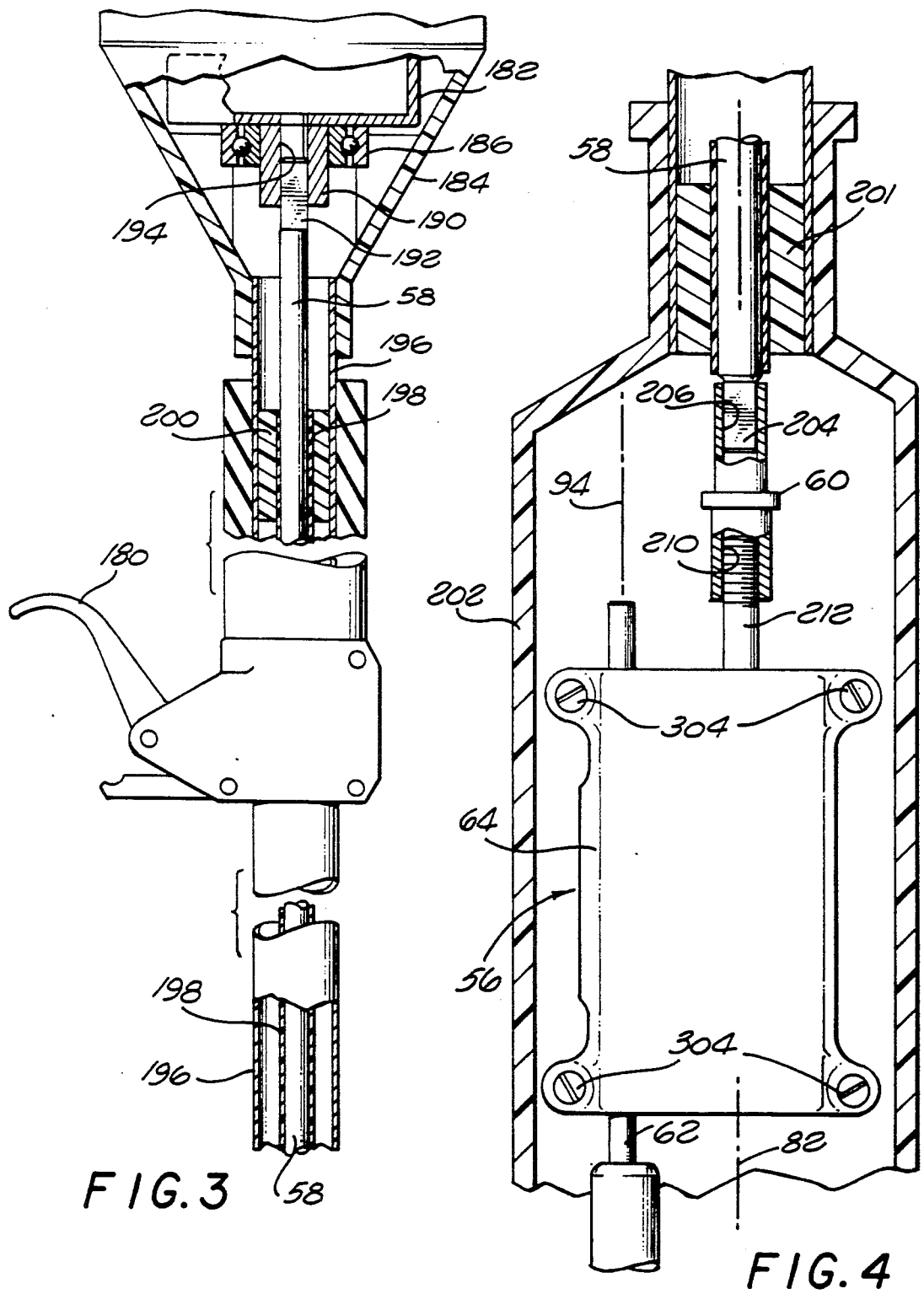

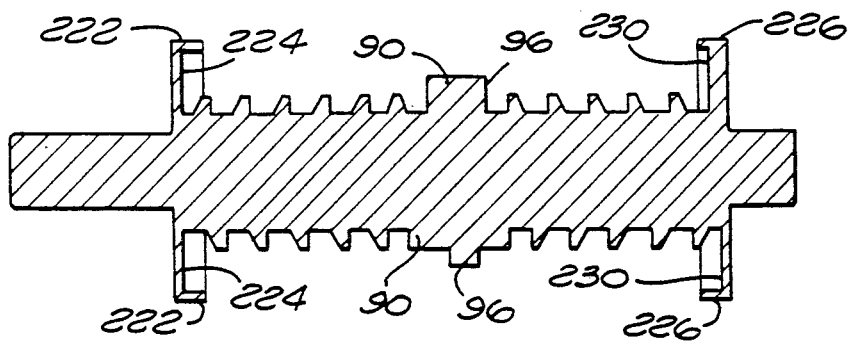
FIG. 9A  SECTION A-A'
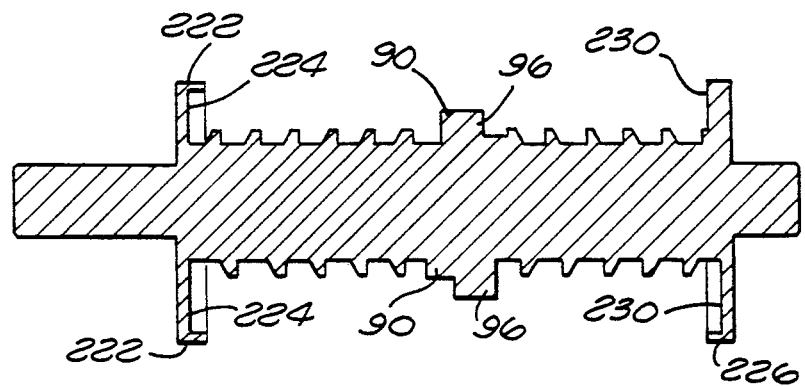
FIG. 9B  SECTION B-B' ROTATED 45°
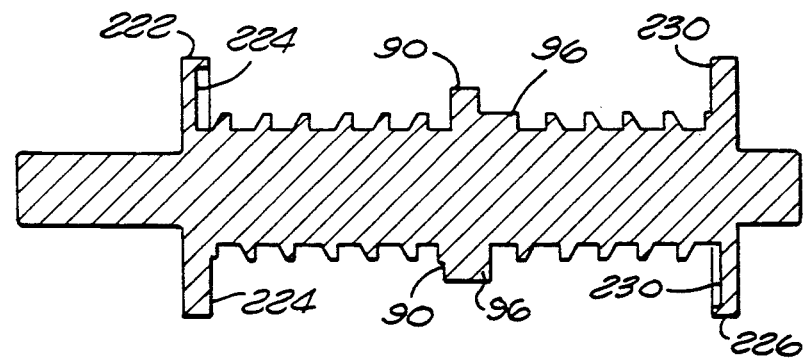
FIG. 9C  SECTION C-C' ROTATED 90°
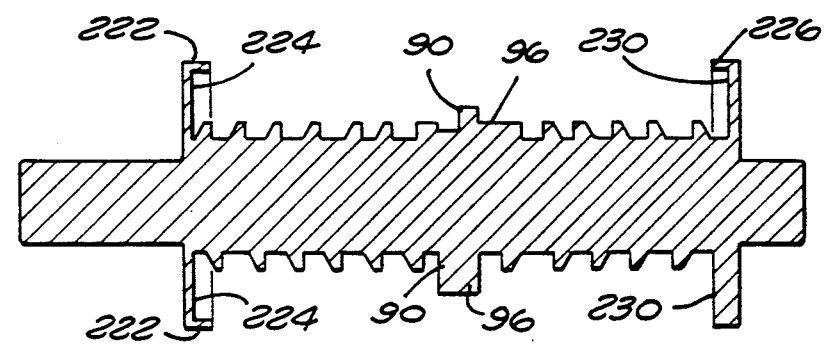
FIG. 9D  SECTION D-D' ROTATED 135°

TOOL DRIVE ASSEMBLY AND RELATED TOOL DRIVE LINKAGE, TOOL WORK IMPLEMENT ASSEMBLY AND TOOL

FIELD OF THE INVENTION

The invention pertains to the field of landscape care apparatus, such as garden care tools, and to tool drive assemblies and drive linkage for such tools and for other forms of tools.

BACKGROUND OF THE INVENTION

Landscape care tools, such as garden care tools, most traditionally have drive trains based upon rotation of a shaft, most typically a shaft from a motor and, in many cases, an additional tool shaft coupled to the motor shaft. And a variety of such tools incorporate straight-forward rotational movement at the output part of the tool which performs the output operations. For example, line trimmers for cutting vegetation typically have rotating heads carrying extended lengths of line to perform the cutting. And snow throwers, which pick up and throw aside snow, and air blowers, which blow aside leaves and other cut or fallen vegetation, typically incorporate an impeller which rotates in straight-forward fashion.

On the other hand, power hoes (or cultivators) based on the "back-and-forth" motion of hoeing tines, do not apply straight-forward rotation at their outputs. As indicated, they adopt a form of cyclical, reversing movement. Moulton, U.S. Pat. No. 4,351,396, issued Apr. 3, 1987, and to be reissued as Moulton et al., U.S. Reissue Pat. No. 33,238, on Jun. 26, 1990, and Motruk, U.S. Pat. No. 4,541,492, issued Sept. 17, 1985, are illustrative of such power hoes. The former emphasizes such apparatus incorporating a motor at the operating end of the tool and the latter emphasizes apparatus incorporating a motor at the other, user end of the tool. In both cases, the drive train incorporates a gear, an axle, and a crank-type arrangement with off-center throws, between the axle and the tines, to change straight rotational movement of a shaft to the back-and-forth movement of the tines. The assembly and operating instructions of HMC (Hawaiian Motor Co.), the assignee of the aforementioned patents, for apparatus including its Model 2370 cultivator and its Model 2371 and 3371 cultivator attachments are representative of up-to-date versions of the apparatus disclosed in such patents.

Another form of landscape care tool, more specifically, a form of vegetation-cutting apparatus, which does not embody straight-forward rotation at its operating output, is a tool known as a reciprocator, which incorporates a pair of generally round blades having teeth, which each turn in one direction and then in the opposite direction through an angle, directly out-of-phase with one another, so that the teeth on one blade and the teeth on the other blade cut vegetation between one another. The magazine *Power Equipment Trade*, January 1989, at pages 28–31, directed to the RedMax Reciprocator (Model SGC22DL), is illustrative. Specifically, in that apparatus, there is a pinion gear-ring gear arrangement, between the rotating tool shaft and a crank shaft, such crank shaft having a pair of off-center throws. Each throw then drives a link which turns a short shaft for one of the pair of blades. Because of the geometry, the short shaft for one of the blades is inside the short shaft for the other.

The present invention incorporates drive linkage which provides linear motion which is particularly beneficial in drive trains for cultivators and reciprocators which do not adopt straight-forward rotational movement at their operational outputs. The implementation is accomplished in a way which is an unusual blend of sophistication and simplicity. The invention is directed to a drive assembly incorporating such linkage, and to a tool incorporating such linkage, such as a tool for cutting vegetation through the rotational oscillation of circular-shaped cutting blades, or a tool for earth-working through the pendulum-like oscillation of hoeing tines. Specific linkage which converts rotational motion to the linear motion, and other specific linkage which provides a clutching function with damping with respect to linear motion, are also the subjects of the invention. Additionally, a form of blade assembly incorporating a pair of generally circular-shaped blades to cut vegetation through rotational oscillation, is provided.

SUMMARY OF THE INVENTION

In accordance with rotational-to-linear motion conversion aspects of the invention, there is provided a tool drive assembly for driving a tool work implement which is to perform operations on matter external to the tool through movement by the implement. The assembly includes: a prime mover; a driver shaft; first linkage to couple the driver shaft to the prime mover and rotate the driver shaft; an implement drive member to incorporate linear movement in response to the rotation of the driver shaft and to impart movement to the work implement through such linear movement: second linkage to couple the drive member to the work implement; and third linkage to impart such linear movement to the drive member in response to the rotation of the driver shaft. This third linkage, then, includes: a worm element to rotate with the driver shaft including a first set of threads angled in a first direction and a second set of threads angled in a second direction; and a tooth carrier carrying a first tooth to engage threads of the first set of threads in order to move the carrier in a first linear direction in response to the rotation of the worm element, and a second tooth to engage threads of the second set of threads in order to move the carrier in a second linear direction in response to the rotation of the worm element; wherein the tooth carrier is operatively connected to the implement drive member.

In accordance with more detailed features of these aspects of the invention, the worm element, as initially described, further includes a first ramp sector and a second ramp sector; and the tooth carrier, as initially described, further carries a first ramp rider projection to ride the first ramp sector and move the second tooth towards engagement with the second set of threads, and a second ramp rider projection to ride the second ramp sector and move the first tooth toward engagement with the first set of threads.

In accordance with other, more detailed features of the invention, the tooth carrier, as initially described, further carries a first catcher projection and a second catcher projection; and the third linkage, as initially described, further includes first and second catchers attached to the worm element, such first catcher to provide a barrier for the first catcher projection toward the extreme of the tooth carrier movement in the second linear direction, and the second catcher to provide a barrier for the second catcher projection toward the extreme of the tooth carrier movement in the first linear direction.

In accordance with clutching aspects of the invention, a tool drive assembly for driving a tool work implement which is to perform operations on matter external to the tool through movement by the implement, includes: a prime mover, a driver shaft, first linkage, an implement drive member and second linkage, as initially described above; and third linkage to impart the referenced linear movement to the drive member in response to the referenced rotation of the driver shaft. Here, however, such third linkage includes: converter linkage including an input connector to rotate with the driver shaft, and an output connector to incorporate linear movement in response to the rotation of the input connector; and clutching linkage to differentiate such linear movement of the output connector and linear movement of the drive member including a shock-absorbing mechanism to compress and expand with such differentiated movement.

In accordance with more detailed features of these clutching aspects of the invention, the shock-absorbing mechanism, as described, includes: a first shock-absorbing member, such as a spring, to compress with the referenced differentiated movement in a first linear direction and to expand with such differentiated movement in a second linear direction; and a second shock-absorbing member, such as a spring, to compress with such differentiated movement in the second linear direction and to expand with such differentiated movement in the first linear direction.

In accordance with more comprehensive aspects of the invention, either the rotational-to-linear motion conversion aspects, or the clutching aspects, may be incorporated into a tool having a work implement to perform operations on matter external to the tool through movement by such implement, such as a circular-shaped cutting blade to perform operations through rotational oscillation or a hoeing tine to perform operations through a pendulum-like oscillation.

Yet other, more focused aspects of the invention, focus on drive linkage to impart linear movement to a drive member in response to rotation of a shaft, in accordance with the third linkage of the rotational-to-linear motion conversion aspects of the invention as initially described. And in accordance with more detailed features, the pitch spacing or the size of the pitch angle, for the first set of worm element threads, as described, may be different than the pitch spacing or the size of the pitch angle, respectively, of the second set of worm element threads, as described. Also, such first set of threads may itself have a plurality of pitch spacings or a plurality of pitch angles or a cyclical series of pitch angle changes having a cycle of 360 degrees of rotation.

In accordance with still other, more focused aspects of the clutching aspects of the invention, drive linkage to differentiate linear movement of an input connector and linear movement of an output connector includes a first shock-absorbing member and a second shock-absorbing member in accordance with the third linkage of the clutching aspects of the invention as initially described.

And, finally, in accordance with work implement aspects of the invention, a work implement assembly for a tool for cutting, includes: a first generally circular-shaped blade to rotationally oscillate and cut, including a first set of teeth having a first tooth form along a first portion of the blade, and a second set of teeth having a second tooth form along a second portion of the blade; and a second generally circular-shaped blade to rotationally oscillate and cut in cooperation with the first blade, including a first set of teeth having the first tooth form along a first portion of the blade, and a second set of teeth having the second tooth form along a second portion of the blade. The blades are formed to face each other during their rotational oscillation. They each also include a third set of teeth having a third tooth form along a third portion of the blade.

BRIEF DESCRIPTION OF THE DRAWINGS

FIG. 1 is a perspective view of a vegetation-cutting apparatus employing generally circular-shaped, saw-like cutting blades that rotational oscillate.

FIG. 2 is a perspective view, broken away, of the operating end of an earth-working apparatus having hoeing tines that oscillate in a pendulum-like fashion, for which the remainder of the apparatus is the same as the apparatus of FIG. 1.

FIG. 3 is a partially cross-sectional, partially elevational view, in part broken away, taken along the line 3—3 of FIG. 1.

FIG. 4 is a cross-sectional view, broken away, taken along the line 4—4 of FIG. 1 or FIG. 2.

FIGS. 9A through 9D are cross-sectional views taken along the lines A—A, through D—D', respectively, as represented in FIGS. 5 and 6.

DETAILED DESCRIPTION

Figure 5:
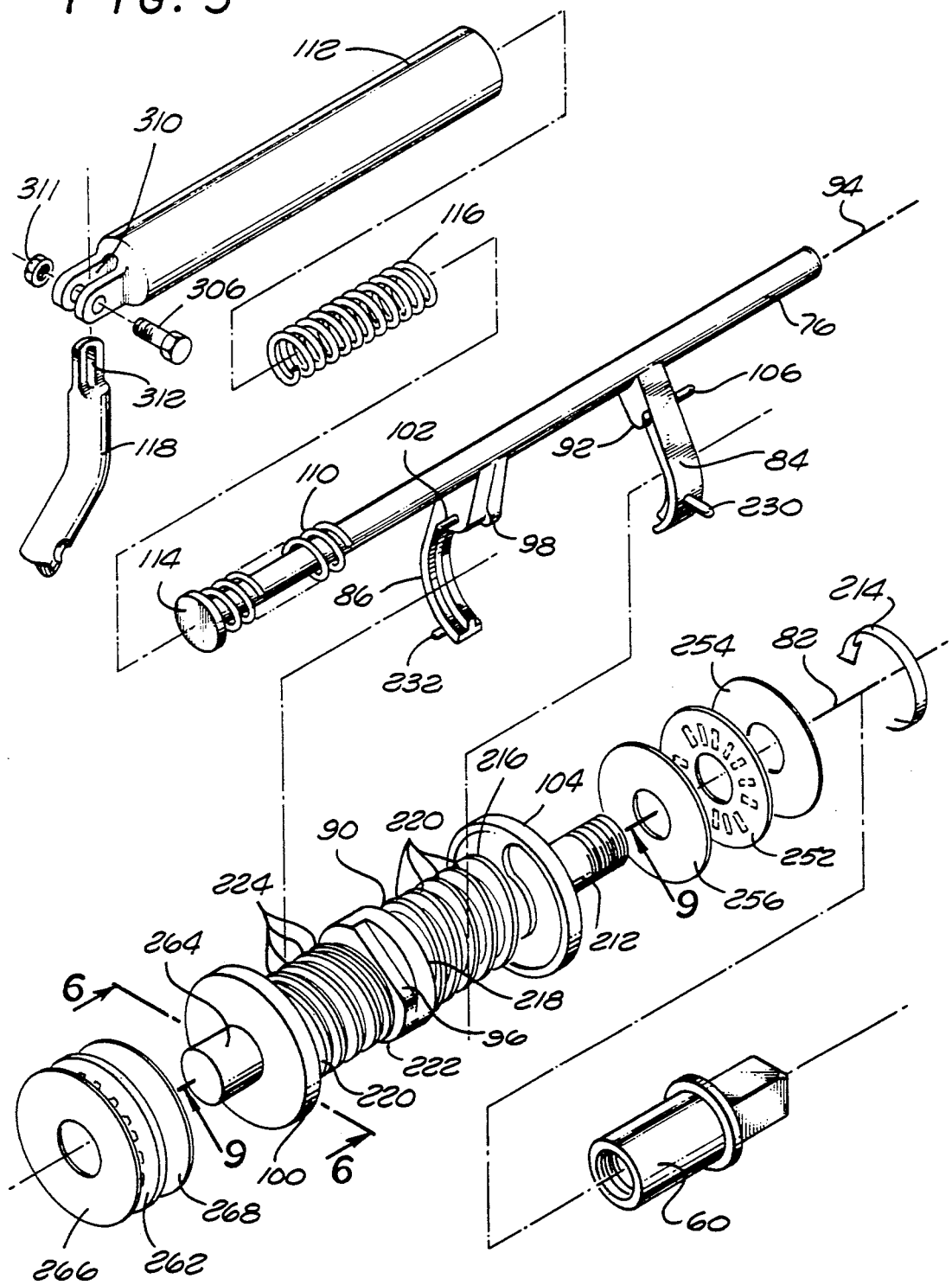
FIG. 5 is an exploded, perspective view, partially broken away, of part of the assembly included in FIG. 4 and of additional assembly components which relate to that assembly.
Figure 6:
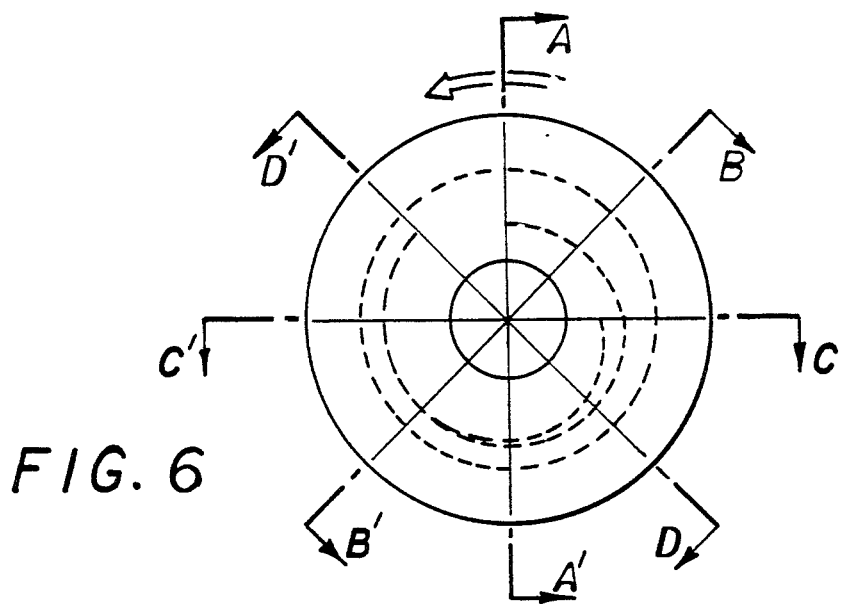
FIG. 6 is a somewhat schematic, elevational view taken along the line 6—6 of FIG. 5.

Referring to FIGS. 1-16, and by way of introduction, there is shown vegetation-cutting tool apparatus and earth-working tool apparatus, along with various assemblies and components thereof, as well as certain illustrative modifications, in accordance with the various aspects of the invention.

In FIG. 1, a vegetation-cutting tool, of the type generally known as a reciprocator, incorporates an operating head having upper 24 and lower 26, generally circular-shaped blades. These blades cut by rotationally oscillating back and forth through an angle, directly out-of-phase, i.e. 180 degrees out-of-phase, with one another, so that the vegetation is cut between the teeth of the two blades as they rotate past one another. The upper blade 24, shown disassembled from the top in FIG. 13A, has a low difficulty set of teeth 30 along a low difficulty portion of the blade 32, an intermediate difficulty set of teeth 34 along an intermediate difficulty portion of the blade 36, and a high difficulty set of teeth 38 along a high difficulty portion of the blade 40. Similarly, the lower blade 26, shown dissembled and from below with reference to the view of FIG. 1, has a corresponding low difficulty set of teeth 42 along a low difficulty portion of the blade 44, an intermediate difficulty set of teeth 46 along an intermediate difficulty portion of the blade 50 and a high difficulty set of teeth 52 along a high difficulty portion of the blade 54. The low difficulty sets of teeth have a form adapted to cut relatively soft vegetation, such as grass or weeds, the intermediate difficulty sets have a form adapted to cut vegetation of intermediate difficulty such as twigs and other similar vegetation, and the high difficulty sets of teeth have a form adapted to cut high difficulty vegetation such as relatively hard wood. Of course, the form of teeth which the operator desires to employ at any given time can be applied to the vegetation to be cut by orienting the tool 20 such that the desired form of teeth move through the vegetation.

Figure 7A:
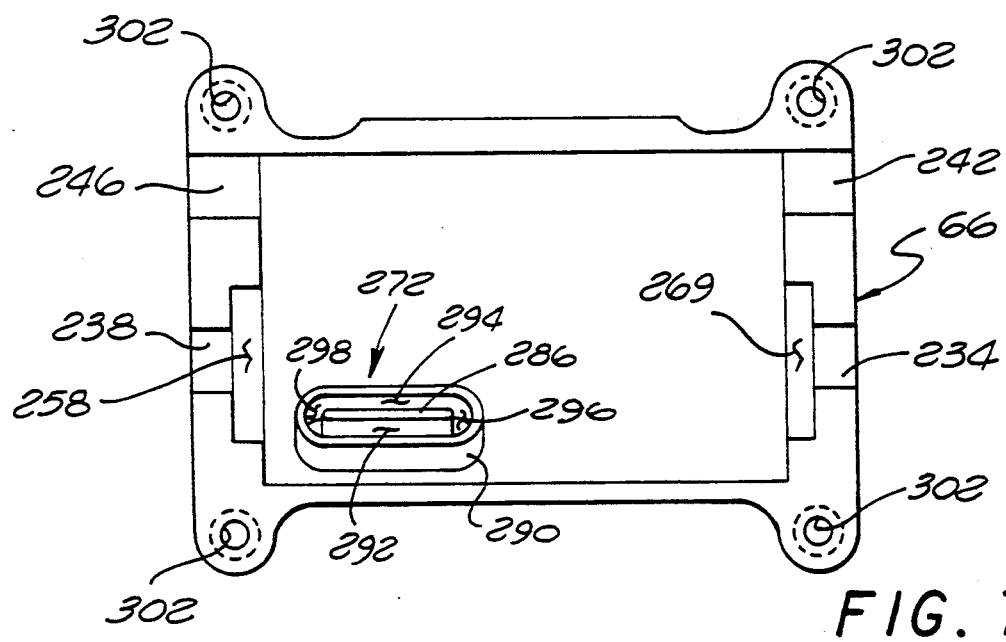
FIG. 7A is a side view showing the inside of a housing member included in FIG. 4 for part of the assembly shown in FIG. 5.
Figure 7B:
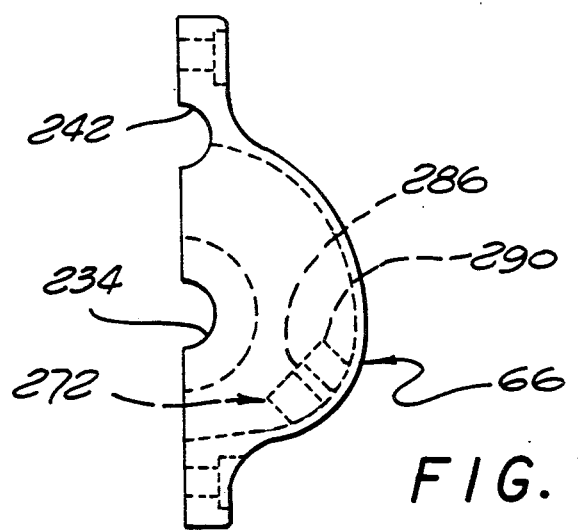
FIG. 7B is one end view of the housing member.
Figure 8A:
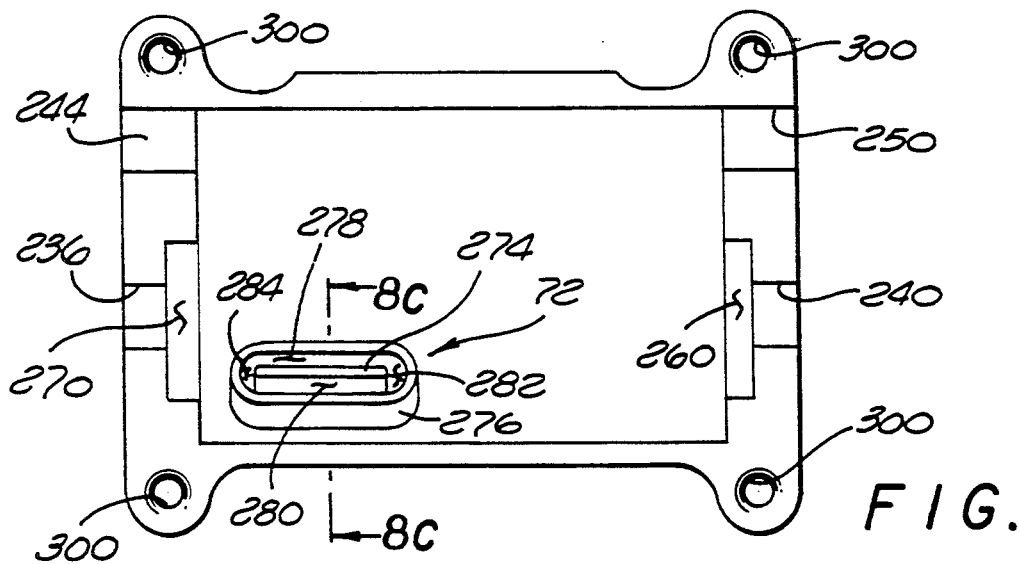
FIG. 8A is a side view showing the inside of the housing member which cooperates with the housing member of FIGS. 7A and 7B.
Figure 8B:
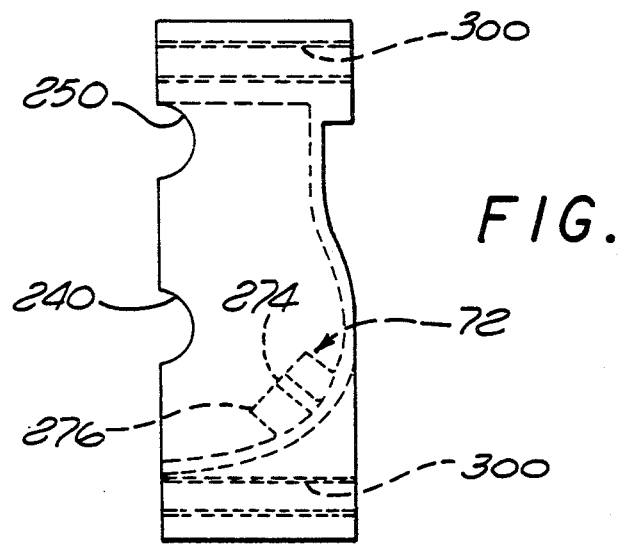
FIG. 8B is one end view of such housing member.
Figure 8C:
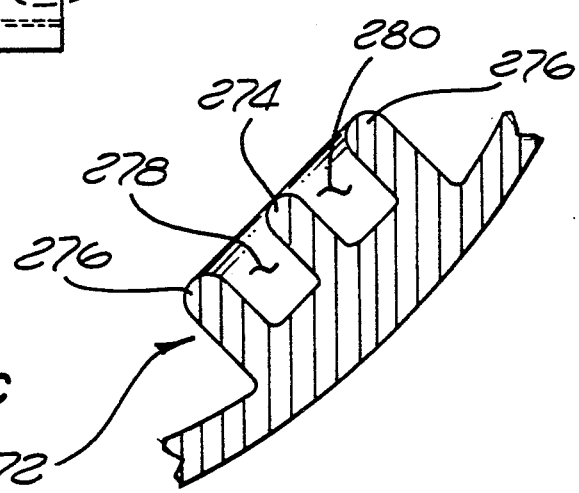
FIG. 8C ia a cross-sectional view taken along the line 8C—8C of FIG. 8.

In FIG. 4, a converter mechanism assembly 56, in the vegetation-cutting tool of FIG. 1, is shown. It converts rotational movement received from the elongated tool shaft 58 at the converter mechanism's input connector, socket member 60, to linear, back-and-forth movement at the mechanism's output connector, tooth carrier 62. The two halves of the housing 64 for the converter mechanism assembly are shown in FIGS. 7 and 8. With reference to the view of FIG. 4, the inside of the front half 66 of the housing, looking out from the paper toward such inside, is shown in FIG. 7A, and an end view of such front half is shown in FIG. 7B. Similarly, again with reference to the view of FIG. 4, the inside of the back half 70, of the housing, looking in the direction into the paper, is shown in FIG. 8A. And an end view of the back half 70, along with a cross-section showing a track sector 72 of the back half, are shown in FIGS. 8B and 8C, respectively. The components within the housing and components which immediately follow them in the drive train are shown in FIG. 5.

Referring to FIG. 5, still with reference to the converter mechanism assembly 56 (FIG. 4), a worm element 74 and a tooth carrier 76 are shown. The worm element has an extender set of threads 78 and a retractor set of threads 80. As is apparent from the drawing, the extender set of threads are along the half of the worm element carrying the socket member 60 which directly connects to the tool shaft 58 (FIG. 4). And the retractor set of threads are along the other half of the worm element. As is also apparent from the drawing, the extender half are angled in one direction, with respect to the axis of rotation 82 of the worm element and the retractor threads are angled in the opposite direction. In the worm element embodiment of FIG. 5, such angles, also, are equal as well as opposite for the two sets.

The tooth carrier 76 carries an extender tooth 84 and a retractor tooth 86. As the tool shaft 58 (FIG. 4) rotates, clockwise looking toward the worm element in the embodiment shown, the extender tooth 84 engages the extender threads 78 which push the extender tooth 84, and thus the tooth carrier 76, in the linear direction, down the drive train, along the tooth carrier axis 94, parallel to the axis of rotation 82 of the worm element 78. However, the extender tooth 84 becomes disengaged from the extender threads while the retractor tooth 86 is becoming engaged with the retractor threads 80. As a result of this engagement on the retractor side, as the tool shaft continues to rotate, the retractor threads push the retractor tooth 86 back up the drive train, and thus the tooth carrier 76 linearly, along the tooth carrier axis and parallel to the axis of rotation of the worm element, in the direction back up the drive train. The cyclical, linear back-and-forth movement of the tooth carrier 76, thus, continues repeatedly with the rotation of the drive shaft.

An extender ramp sector 90 of the worm element 74 and an extender ramp rider 92 on the extender tooth 84 cooperate in rotating the tooth carrier 76 through an angle about the tooth carrier axis 94 to accomplish the transition from the extender operation to the retractor operation. Similarly, a retractor ramp sector 96 of the worm element and a retractor ramp rider 98, on the retractor tooth 86, cooperate in rotating the tooth carrier back through the opposite angle to accomplish the transition from the retractor operation back to the extender operation. A retractor catcher 100, on the retractor end of the worm element 74, provides a safety barrier for a retractor catcher projection 102, on the retractor tooth 98, in the transition from the extender part of the cycle to the retractor part of the cycle. Similarly, an extender catcher 104, on the extender end of the worm element, provides a safety barrier for an extender catcher projection 106, on the extender tooth 84, in the transition from the retractor part of the cycle back to the extender part of the cycle.

The extender part of the cycle, of course, refers to the movement of the tooth carrier linearly down the drive train and the retractor part of the cycle refers to the return of the tooth carrier in the opposite linear direction back up the drive train.

Still referring to FIG. 5, and still generally by way of introduction, the tooth carrier 76, down the drive train, beyond the retractor tooth 86, has a spring 110 thereabout which may be descriptively termed the carrier-minus-case spring. The carrier 76 extends into a spring case 112 through an opening (not shown) at the back of the case, and the spring is housed in the case against a spring stop 114 at the front end of the spring, which is attached on the front end of the tooth carrier 76, and against the back of the case which is behind the spring. There, then, is a corresponding case-minus-carrier spring 116 which is disposed between the spring stop 114 and the front of the spring case 116. This arrangement, relating to the springs and spring case, provides a damping, shock-absorbing mechanism between the back-and-forth linear movement of the tooth carrier 76 and the resulting movement of the spring case. This damping, shock-absorbing mechanism, then, is a clutching mechanism.

In relatively normal or typical operations, the springs 110 and 116 will transfer the power from the tooth carrier 76 to the spring case 112 essentially without compression or expansion. However, compression and expansion, with the damping, shock-absorbing, clutching effects, come into play where the typical, desired operation does not obtain. This may involve, for example, the engine operating at a faster speed (greater number of rotations per minute) than desired for the normal operation of the tool, or the work implements at the operating end of the tool encountering matter more difficult than that which is ordinarily expected, or of extreme difficulty which might otherwise break the apparatus, such as a relatively large rock or a wall.

Figure 10:
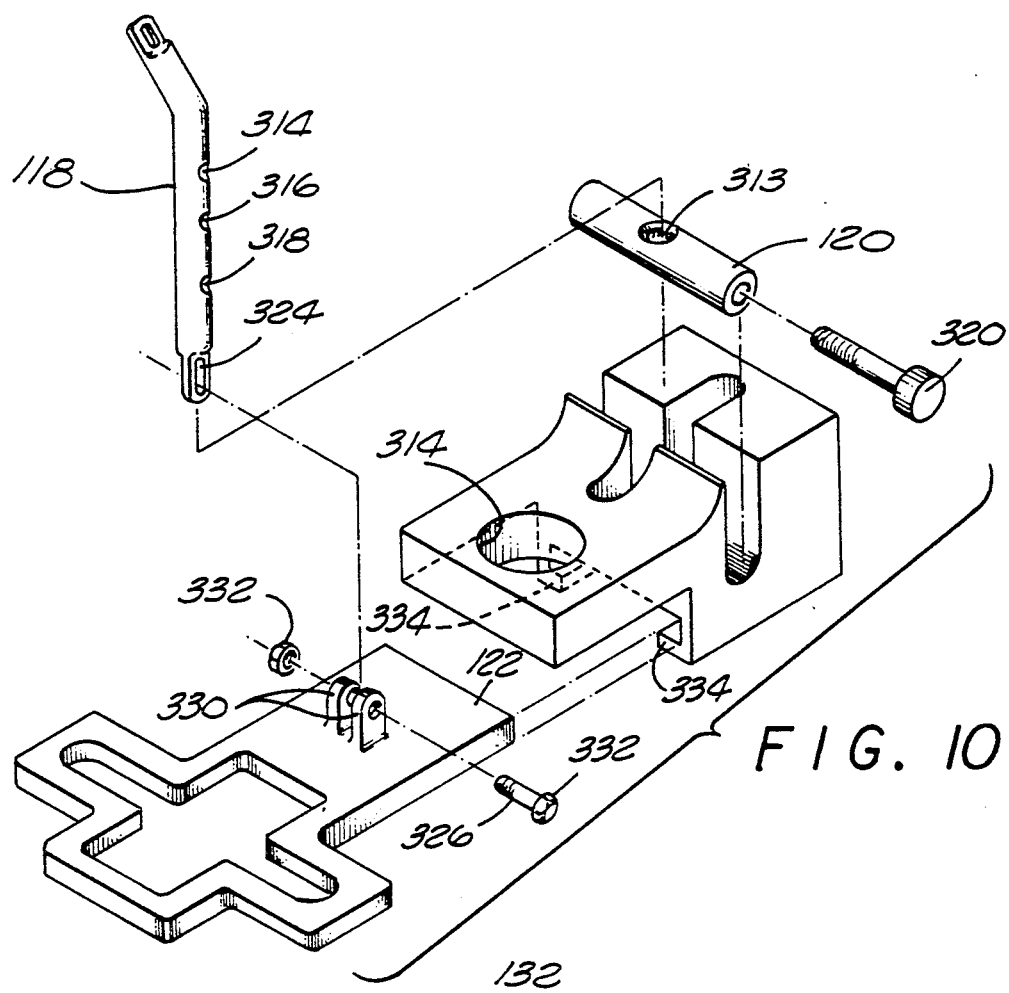
FIG. 10 is an exploded, perspective view of an assembly in the apparatus of FIG. 1 which is a continuation, from FIG. 5, of the drive train for the apparatus of FIG. 1.

In FIG. 10, the components of the drive train for the vegetation-cutting tool operating end 22, following those in FIG. 5 are shown. And in FIG. 11, some of the components, along the next section of the drive train, similarly are shown. Referring to FIG. 10, a reciprocator arm 118, a rocker 120 for the arm, a reciprocator yoke 122 and a reciprocator mounting piece 124 are designed to continue the back-and-forth linear movement along the drive train, while angling such linear movement away from along a parallel to the tool shaft 58 (FIG. 4) By varying the connection of the arm 18 to the rocker 120, the amount of yoke movement caused by a given amount of spring case 112 (FIG. 5) movement can be varied and, as a result, the angle of rotation through which the generally circular-shaped blades 24 and 26 (FIG. 1) rotate due to the movement of the spring case can be varied. The linear, back-and-forth movement of the yoke 122 acts on an upper blade pin 126 to oscillate the upper blade. The yoke also acts on a link pin 130 projecting from a link 132. That link then rotates a lower blade shaft 134 to which the lower blade is rotationally coupled, thus accomplishing the rotational oscillation of the lower blade directly out-of-phase, i.e., 180 degrees out-of-phase, with the upper blade. FIG. 12 shows the referenced structure from a cross-sectional perspective which includes the components of FIG. 11 as well as other related components.

The same tool as shown in FIG. 1, alternatively, could be configured with the earth-working operating end of FIG. 2 in place of the vegetation-cutting operating end of FIG. 1. Because this is so, and for ease of description and understanding, this is assumed to be the case herein. Thus, with respect to the vegetation-cutting operating end in FIG. 1, FIGS. 4 through 9 represent the embodiment with that operating end. However, such figures also represent the embodiment with the earth-working operating end of FIG. 2. However, certain differences between those components of FIGS. 4 through 9, which may be adopted and exist for the two different types of operating ends, as well as variations which might typically occur to change the characteristics of the vegetation-cutting or earth-working operating end will also be noted.

Figure 16A:
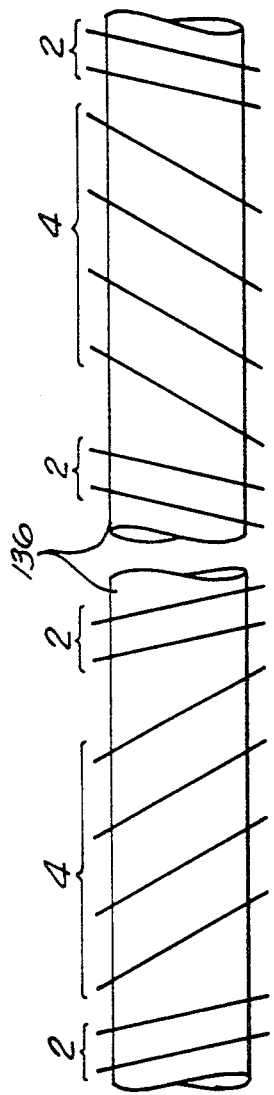
FIG. 16A is a schematic drawing representing one variation for the threads of the worm element shown in FIG. 5.
Figure 16B:
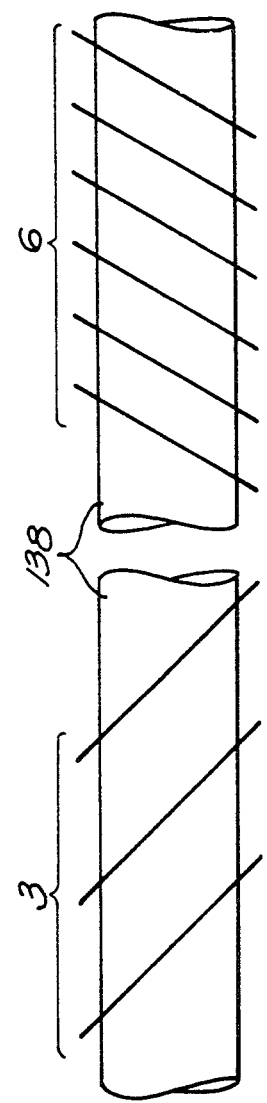
FIG. 16B is a schematic drawing showing a second variation for the threads of the worm element of FIG. 5.

For example, FIG. 16A represents a deceleration worm element 136. Rather than having a set of six uniform extender threads and retractor threads, this worm element, in each case, varies the threads at the end of the set to slow the linear motion resulting from the threads where the transitions between the extend portion of the cycle and the retract portion of the cycle occur. On the other hand, a fast-retract worm element is represented in FIG. 16B in which the retractor set of threads number only three while the extender set remains six so that six tool shaft rotations are required for the extender tooth to move along the set of extender threads, but only three rotations are required for the retractor tooth to move along the retractor set of threads.

Figure 16C:
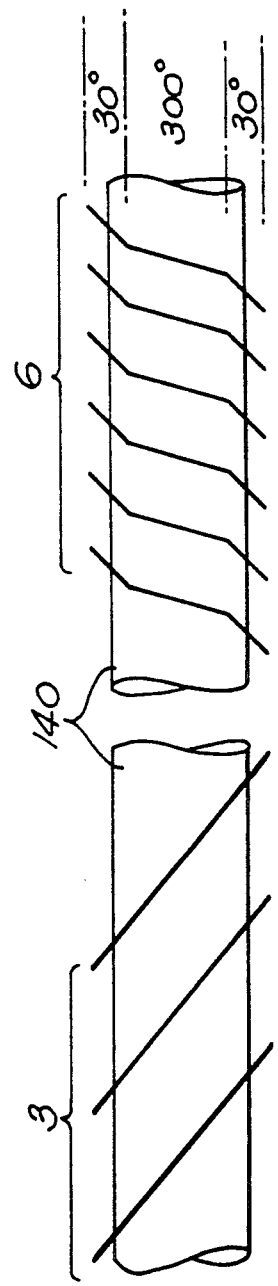
FIG. 16C is a schematic drawing, showing a third variation for the threads of the worm element of FIG. 5.

In FIG. 16C, a fast-retract and variant extender thread worm element is represented. Here, the set of retractor threads is as in FIG. 16B. And the set of extender thread numbers the same as in FIG. 16B; however, each of the extender set of threads has one form for 60 degrees of its 360 degree extent and another form for 300 degrees. By way of example, such a variation can be adopted to adapt the threads to a power variation from the prime mover during the 360 degree rotation cycle of the prime mover—a characteristic which is typical of prime movers, particularly of the gas-powered variety.

Figure 14:
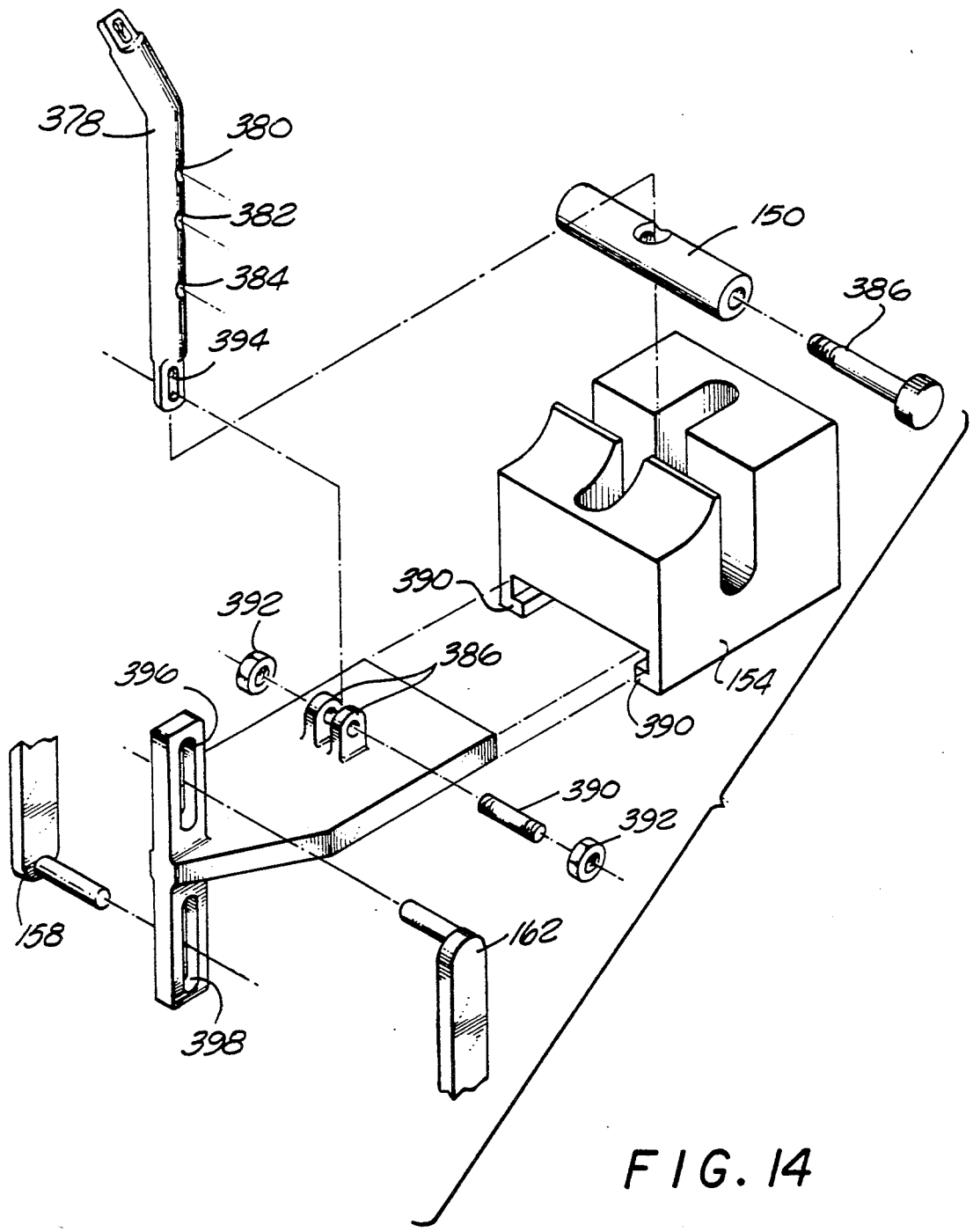
FIG. 14 is an exploded, perspective view of an assembly in the operating end apparatus of FIG. 2 which follows, along the drive train, the assembly of FIG. 5.
Figure 15:
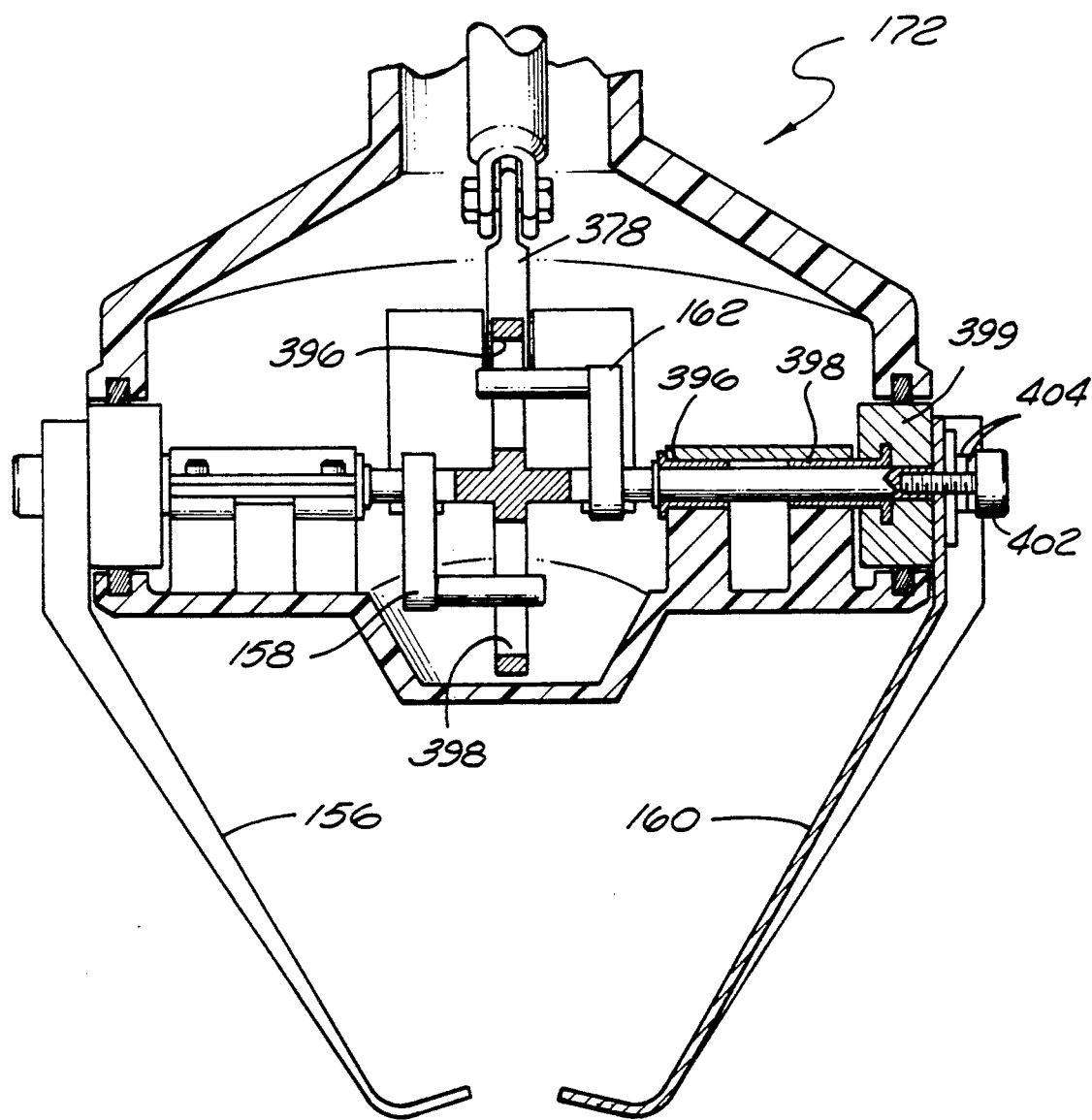
FIG. 15 is an elevational view, partially in section, partially broken-away, of the operating end apparatus of FIG. 2, taken generally along the line 15—15 of FIG. 2 from in front of and above the operating end apparatus of FIG. 2, with the upper half of the operating end housing removed.

With respect to differences between the operating end for the earth-working tool and for the vegetation-cutting tool, FIG. 14 shows the parts for the operating end of the earth-working tool which correspond to the parts of FIG. 10 for the operating end of the vegetation-cutting tool. Thus, in FIG. 14, there is a cultivator arm 146, a cultivator rocker 150, a cultivator yoke 152 and a cultivator mounting piece 154. And FIG. 15 shows these components and the components down the drive train therefrom for the earth-working operating end. Thus, with reference to the view of FIG. 15, there is a left hoeing tine 156, which moves with a left connecting arm 158, which, thus, both are driven by the yoke 152, 180 degrees out-of-phase with a right hoeing tine 160 and a right connecting arm 162. A right rocker shaft 164, which can be seen in FIG. 15, to which the right connecting arm and right hoeing tine are fixed, rotationally oscillates with the movement of the connecting arm and tine, serving as a shaft for the movement of the tine and arm, including the pendulum-like oscillation of the tine. At the left in FIG. 15, a left rocker shaft cover 166, in place, covers most of the left rocker shaft 170.

Now some of the features already addressed by way of introduction and summary, will be described in additional detail, and other related features will also be described in detail.

Turning to FIG. 1, as previously observed, the part of the tool 20 down to the operating head end 22 for a vegetation-cutting tool applies both to that operating head end and to an operating head end 172, shown in FIG. 2, for the earth-working tool. The operator (or power) end of the tool, as shown in FIG. 1, has a motor 174, of a fully conventional type at the top, a hand grip 180 of a rubber material for one hand of the user, near the motor, a throttle lever 178 for the motor, and a handle 180, somewhat below the throttle lever, for the other, lower hand of the user.

Turning to FIG. 3, as is conventional, the throttle lever 180 is pushed to cause the engagement of a conventional centrifugal clutch employing a clutch drum 182 (with the members which fly out to engage the inside of the drum, not shown). A conventional ball bearing is press-fit inside a clutch housing 186 (the details of such clutch housing press-fit not shown). An arbor 190, which is fixed to and may be integral with the clutch drum, is press-fit inside the ball-bearing. A snap-ring (also not shown) may be snap-fit about the arbor against the ball-bearing 184, as an added precaution to maintain the ball-bearing in its press-fit position. As can be readily appreciated, these aspects, as well as the squared-off upper end 192 of the tool drive shaft 58 which fits into a square opening 194 through the arbor, are fully conventional. Of course, it will be evident that detailed aspects of this can be readily varied, as convenient, without affecting the mode of operation.

The motor, or engine, as shown, is a gasoline engine. However, an electrical motor, also, can readily be employed. One-cylinder, two-cycle, air-cooled, recoil starter gasoline engines of the type sold by the Mitsubishi Organization are exemplary of the type of conventional engine which is fully appropriate.

The tool 20, whether in its vegetation-cutting tool form as represented in FIG. 1 or in its earth-working tool form having the earth-work operating end of FIG. 2, as is conventional for tools of this type, has a shaft tube 196, which serves as a cover for the elongated tool drive shaft 58 and for various elements associated with such shaft. Still referring to FIG. 3, the tool employs a conventional tubular liner 198 of a plastic material about the tool shaft. This liner extends upward to the vicinity of the clutch housing 186, near the motor 174. There are then conventional spacers, which might be three in number, one of which is shown at 200 (and another at 201 in FIG. 4), of a rubber material, along the liner, between the liner and the drive shaft tube 196. As is conventional, these spacers are distributed along the length of the shaft tube portion of the tool. Again, as will be evident, these features are fully conventional.

As already indicated, FIG. 4 shows a portion of the drive train, for either the vegetation-cutting operating end of FIG. 1 or for the earth-working operating end of FIG. 2. It shows such portion inside the narrowed, upper part 202 of the operating end housing for either operating end. Referring to that figure, the elongated tool drive shaft 58 ends in a squared-off portion 204 of the shaft which fits into, for purposes of rotational coupling, a squared-off receiver socket 206 of the input connector, socket member 60, previously referred to. The opposite end of the socket member, down the drive train, has an internally threaded opening into which the externally threaded, extender end 210 of the worm element is threaded (see also FIG. 5). So the tool drive shaft 58 rotates the worm element 74, through the input connector, socket member in straight-forward fashion. As indicated in FIG. 5 by a rotational direction arrow 214, the tool shaft is assumed to rotate clockwise, looking down the drive train for the tool.

As previously noted, FIGS. 5 through 9, as well as FIG. 4 as just discussed, apply equally well to either the vegetation-cutting operating end 22 of FIG. 1 or the earth-working operating end 172 of FIG. 2. And turning to FIGS. 5 through 9 in additional detail, in the embodiment shown in FIG. 5, there are assumed to be six threads in the set of extender threads 78 and, also, six threads in the set of retractor threads 80. In this regard, as would be expected, each given thread covers a complete revolution so that it ends at the same angular position at which it starts, but, of course, at a different position along the length of the worm element 74. Thus, there is an outside, upper extender thread 216 and an outside, lower extender thread 218. And the start, along the worm element, of that upper thread defines the starting and ending angular position for each of the six threads, including the four intermediate extender threads 220. Similarly, with regard to the set of retractor threads 80, the angular position of the start and termination for each of these six threads, then, is the same as the angular position of the start of the outside, lower retractor thread 220. Along the same lines as for the extender set of threads, of course, there also is an outside, upper retractor thread 222 and four, intermediate retractor threads 224.

Each of the extender threads 78, as is apparent in FIG. 5, is angled an equal angle to each of the other extender threads, and in one direction, and each of the retractor threads 80 is angled an angle which is equal to that of each of the other retractor threads, and which is in the opposite direction as for the extender threads. As would be expected, such angles are measured as the angle away from how the thread would be oriented if it were oriented perpendicular to the axis of rotation 82 for the worm element 74 so as not to push the tooth it would engage, and thus the tooth carrier, in either linear direction. Thus, in FIG. 5, the extender threads are angled in the direction which acts on the extender tooth 84 carried by the tooth carrier 76, to extend the tooth carrier in the linear direction, down the drive train, along the tooth carrier axis 94, with the rotation of the worm element by the tool shaft 58. And the retractor threads are angled such that they act on the retractor tooth 86 carried by the tooth carrier, to return the tooth carrier back up the drive train along the tooth carrier axis, with such rotation.

In the transition during the cyclical linear movement of the tooth carrier from the extend part of its cycle to the retract part of its cycle, as the extender tooth 84 is being pushed along by the outside, lower extender thread 218 toward the mid-plane of the worm element 74, the extender ramp rider 92 is contacted on its underside by the extender ramp sector 90 (see also FIGS. 9A through 9D). This extender ramp sector 90 has a form, which to the extender ramp rider 92, appears as a ramp which the ramp rider follows as it continues down the worm element along the ramp sector. The effect of this is that the form of the ramp sector causes the tooth carrier 76 to, with reference to FIG. 5, rotate away from the worm element about the axis 94 of the tooth carrier. This, of course, at the same time, causes the retractor tooth 86 to rotate with the tooth carrier, toward the worm element. After the extender tooth 84 has rotated through an angle sufficient to avoid engagement with the extender threads, with the retractor tooth 86 rotating a sufficient angle to engage the retractor threads, the ramp sector reverses, at that point along the sector, both its ramp effect and the direction, along the worm element, which it pushes on the extender ramp rider 92. Thus, the extender ramp sector, at that point along the worm element, becomes a downward ramp and also pushes the ramp rider back off the ramp sector. With this occurring, the retractor tooth 86 starts being pushed in the direction up the drive train, after hitting against the worm element between the outside, lower retractor thread 220 and the intermediate retractor thread next to it. Thus, the rotation of the tooth carrier 76 and of the extender tooth 84 stop with the extender tooth 84 at a position that it can move back up along the worm element without engaging the retractor threads 78. Thus, with the retractor tooth 86 engaged and the extender tooth not engaged, the continued rotation of the worm element now forces the tooth carrier 76 in the direction back up the drive train in the retract part of the cycle.

The reverse of this, of course, occurs as the retractor tooth 86 approaches the retractor ramp sector 96 of the worm element (see also FIGS. 9A through 9D). Thus, the retractor tooth becomes disengaged, the extender tooth becomes engaged, and the extend part of the cycle begins again. The extender ramp sector 90 and the retractor ramp sector 96, of course, in keeping with the different angular positions of the extender 84 and retractor 86 teeth, are out-of-phase with one another, so far as their form with respect to a given angular position on the worm element is concerned. But apart from that, their forms are analogous in that they are mirror images of one another. Thus, when the worm element 74 is oriented so that the start of the extender ramp sector is at one angular position, the start of the retractor ramp sector is at a different angular position. And when the worm element is oriented so that the position where the extender ramp sector reverses to a down hill ramp and acts to push in the direction up the drive train rather than down the drive train is at one angular position, the position of the retractor ramp where such occurs is also at a different angular position. Also, although the ramp sectors are designed and formed such that the riding of the ramp rider on the ramp sector could be for in the range of 360 degrees of rotation, the actual contact of a ramp rider with a ramp sector, during which the ramp rider encounters an upward part of the ramp which pushes the ramp rider toward the center of the worm element, and then continues along a portion of the ramp in which these two effects are reversed, may, more typically, approach 90 degrees of rotation or even less. Saying this another way, the transition, caused by the ramp sectors, can readily occur over an angle of rotation substantially less than 360 degrees. From another, somewhat more abstract perspective, each ramp sector may be generally viewed as in the nature of a continuation of the threads which lead to it, but with a spiral outward and then back inward, and with a reversal in thread angle direction occurring with the reversal from outward to inward of the spiral.

The extender catcher 104, the extender catcher projection 106, the retractor catcher 100 and the retractor catcher projection 102 are also present for purposes of the transitions between the extend and retract part of the cycle for the linear movement of the tooth carrier 76. Specifically, the extender catcher is formed to have a circular shape and to have a circumferential extender catcher flange 222. As can be seen by reference to FIGS. 9A through 9D, the extent of the projection provided by the flange toward the mid-plane of the worm element, varies with angular position on the worm element. Similarly, and related to this, the thickness of the base of the extender projection also varies with such angular position. Thus, the surface 224 of such base facing toward the extender contact projection 106, along a portion thereof, presents an annular ramp form to such catcher projection. The purpose of the flange is to provide a circumferential barrier for the extender catcher projection in transitions from the retract portion of the cycle to the extend portion of the cycle. And the purpose of the annular ramp form is to provide a similar end barrier for the linear movement of the extender catcher projection. Depending on the particular details as to form and interaction, along with the particular operational circumstances, including loading, the extender catcher projection may or may not contact the extender catcher flange or the extender catcher base surface in the transition. However, even if such contact does not occur in a particular circumstance, the barrier exists and contact may occur if different conditions arise at a different time. The ramp form provided by the extender base catcher surface, where there is such contact with such surface, because of such form, can act as a push-off ramp for the extender catcher projection and, thus, aid in accomplishing the change in linear direction associated with the transitions from the retract to the extent parts of the tooth carrier cycle.

The retractor catcher 100 has a form which would be the mirror image of the extender catcher 104, except, of course, it has a different angular disposition on the worm element 74, to provide an analogous barrier for the retractor catcher projection 102 in transitions from the extend part of the cycle to the retract part of the cycle. The circumferential retractor catcher flange 226, and the retractor catcher base surface 230, presenting an annular ramp form to the retractor catcher projection, which are analogous to the corresponding elements for the extender catcher 104, can be readily seen in FIGS. 9A through 9D.

Although such, of course, can vary, where there is contact between a catcher projection and a catcher flange or catcher base surface presenting the ramp form, the angle of rotation through which such contact might occur could, for example, most typically, be in the range of 90 degrees or less. As indicated, however, that can substantially vary.

The mounting of the worm element 74 and of the tooth carrier 76 in the housing 64 for such components, and the interaction of an extender guide projection 230, projecting from the extender tooth 84, and of a retractor guide projection 232, projecting from the retractor tooth 102, with parts of the housing, can be appreciated by reference to FIGS. 5, 7A and B and 8A, B and C. The front half 66 (with reference to the view of FIG. 4) of the housing is formed to provide half of each bearing surface for the rotation of the worm element and for the linear movement, as well as the rotational movement through an angle in accomplishing the cyclical transitions, of the tooth carrier 76. Thus, the front half 66 of the housing has a lower (with reference to the direction of the drive train in FIG. 4) worm element bearing surface 234 which cooperates with a lower worm element bearing surface 236 of the back half 70 of the housing. They together form a circular-shaped bearing surface about the retractor end of the worm element. There are then analogous upper worm element bearing surfaces 238 and 240 of the front and back halves of the housing, respectively, for the extender end of the worm element, which provide the same function at that end. Similarly, lower tooth carrier bearing surfaces 242 and 244 of the front and back halves of the housing, respectively, cooperate to provide a circular-shaped bearing surface for the tooth carrier 76 along the retractor-tooth end of the carrier. Similarly, upper tooth carrier bearing surfaces 246 and 250 of the front and back halves of the housing, respectively, cooperate to provide a circular-shaped bearing surface along the extender-end of the tooth carrier.

An upper thrust bearing 252 fits about the extender end 212 of the worm element. It is mounted between an upper, outer 254 and upper, inner 256 thrust washer. These, of course, are conventional parts used in conventional ways. An upper thrust cavity, then, is formed by the worm element, tooth carrier and related component housing 64, for these upper thrust components. The cavity, which is formed specifically for such components, is provided by the cooperating upper thrust component cavities 258 and 260 in the front 66 and back 70 housing halves, respectively. There then is an analogous lower thrust bearing 262 about the retractor end 264 of the worm element, a lower, outer thrust washer 266 and a lower, inner thrust washer 268. And lower thrust component cavities 269 and 270 of the front 66 and back 70 halves of the housing, cooperate to form a housing cavity for the lower thrust components.

Referring back to the retractor guide projection 232, the track sector 72 of the back half 70 of the housing 64 for the worm element, tooth carrier and related components, has a form which provides guiding structure for the retractor guide projection during the linear movement of the tooth carrier 76 and, thus, provides a guiding function for the tooth carrier 76 itself. There also is an analogous track sector 272 of the front half 66 of the housing which interacts analogously with the extender guide projection 230. Specifically, and referring to the back housing half, track sector 72, that sector has a central wall 274 and an outer wall 276. There is then in the nature of an elongated, generally oval-shaped channel between such walls having an extend portion 278, a retract portion 280, a retract-to-extend transition portion 282 and an extend-to-retract transition portion 284. The spacial relationship of the back half of the housing and of the retractor guide projection 232 on the retractor tooth 86, then, is such that the retractor guide projection moves along the extend portion 278 of the channel as the tooth carrier extends in its linear direction down the drive train. In the transition from that extend part of the cycle to the retract part of the cycle, the retractor guide projection 232 moves through the extend-to-retract transition portion 284 of the channel into the retract portion 280 of the channel. And, then, during the retract part of the cycle, the retractor guide projection moves along the retract portion of the channel. In the transition back to the extend part of the cycle again, the guide projection moves through the retract-to-extend transition portion 282 of the channel back to the extend portion of the channel.

The relationship and interaction between the extender guide projection 230 and the track sector 272 of the front half 66 of the housing 64 is analogous. Thus, that track sector 272 also has a central wall 286, an outer wall 290 and a channel between such walls. The channel has an extend portion 292, a retract portion 294, an extend-to-retract transition portion 296 and a retract-to-extend transition portion 298. The extender guide projection 230, then, as the tooth carrier 276 extends down the drive train, moves along the extend portion of the channel. In the transition from the extend part of the cycle for the tooth carrier to the retract part, the extender guide projection moves through the extend-to-retract portion 296 of the channel, to the retract portion of the channel. It, then, during the retract part of the tooth carrier cycle, moves along the retract portion of the channel, and returns to the extend portion, through the retract-to-extend transition portion 298, in the transition back to the extend part of the tooth carrier cycle.

The guide projections 230 and 232, along with the track sectors 72 and 272 may generally be considered to be in the nature of an extra, redundant protection. Specifically, the encountering of the worm element 74 by the extender 84 and retractor 86 teeth during operation is designed to define and limit the back-and-forth rotation of the tooth carrier 76 during its cyclical movement. However, the walls of the track sectors 72 and 272 are also present to limit such movement and to provide additional strength against forces which may be exerted by the teeth during the operation of the device. Thus, the guide projections 230 and 232, along with the track sectors 72 and 272 may be designed so that there is, in fact, guide projection-wall contact during normal operation—i.e., such that the walls can provide added strength in normal operation. On the other hand, the design can be such that guide projection-track sector wall contact during normal operation generally does not occur or is not expected, but that such contact generally occurs or is expected only during more extreme circumstances.

The walls of the track sectors 72 and 272, as shown in FIGS. 7 and 8 are of the same material, and integrally formed with, the remainder of the halves of the housing 64 for the worm element, tooth carrier and related components. One material which is particularly advantageous is a zinc alloy sold by a variety of manufacturers under the designation ZA8. This is a self-lubricating alloy. Such a self-lubricating alloy is particularly advantageous where, as in the embodiment shown, the housing material provides bearing surfaces for the worm element 74 and tooth carrier 76. However, with respect to the track sectors, for purposes of added strength, lengths of a stronger material, such as a steel material, can be disposed within wall portions of the track sector and molded into surrounding material of the housing halves. As indicated, this is an alternative for added strength along such wall portions.

Referring to FIGS. 7 and 8, the back half 70 of the housing 64 has four internally-threaded screw holes 300 therethrough and the front half 66 has four respectively cooperating unthreaded screw holes 302 therethrough. Each of four connector screws 304 then extends through such a screw hole 302 of the front housing half and is threaded into a corresponding screw hole 300 of the back housing half (FIG. 4). As shown in FIGS. 7A and 7B, these screws can be counter-sunk below the outer surface of the front housing half.

The operation and interaction of the case-minus-carrier spring 116, the spring stop 114, the carrier-minus-case spring 110 and the spring case 112, with the cyclical linear movement of the tooth carrier 76, has already been described in some degree of detail. Thus, it has already been noted how such elements act as in the nature of a clutching, and shock-absorbing or shock damping, mechanism. Thus, the case-minus-carrier spring 116 compresses with respect to its normal, at-rest state in the spring case 112, when the difference in the positions, down the drive train, of the case 112 and the tooth carrier 76, becomes less than the normal, at-rest state difference. This spring, then, expands from its at-rest state, when such difference becomes greater than the at-rest state difference. On the other hand, the carrier-minus-case spring becomes compressed from its normal, at-rest state in the spring case, when the difference in position, down the drive train, of the case 112 and the tooth carrier 76 becomes greater than the normal at-rest state difference. And this spring expands from its at-rest state, when such difference in positions become less than the normal, at rest state difference. As is apparent from this description, and from FIG. 5, this difference can be viewed with respect to the ends of the case 112 and tooth carrier 76 which are at the down-drive train ends of such components.

The springs 116 and 110 can be standard springs made of standard spring steel. On the other hand, if specially made, including specially tempered and wound to desired specifications, the design could incorporate springs which are very short—such as of the order of one-half inch or less. It is desirable that the springs, which are identical, have a spring constant which is sufficiently large to essentially avoid compression or expansion, from their normal at-rest state in the case 112, over a substantial range of operation by the tool. Where that exists, the springs essentially act merely to transfer power and not in a clutching, or shock-absorbing or damping, fashion The springs, of course, also, have to be able to cycle at the rate of the cycling for the tooth carrier. Simply by way of example, for the earth-working operating end 172 (FIG. 2), the springs might start to compress and expand from their normal, at-rest state when the tool reaches an unloaded rate of cyclical hoeing tine movement (and thus tooth carrier movement) of 2,500 cycles per minute. The springs might then, when that rate reaches 3,500 cycles per minute, cycle between their fully-compressed and fully expanded states, and, essentially stop the transfer of any meaningful power down the drive train. As indicated, these exemplary characteristics are set forth for an unloaded state at the operating end. However, the loading at the operating end, of course, is a variable which affects when the springs begin to compress and expand from their normal, at-rest states and reach a situation when, during the cycle of back-and-forth movement of the tooth carrier 76, they reach fully compressed and expanded operation. Thus, for example, encountering a large, immovable rock, which without the spring-related mechanism, might severely damage the drive train, with the spring-related mechanism, may well not cause significant damage.

With respect to the vegetation-cutting operating end 22 (FIG. 1), by way of example, the onset of compression and expansion from the normal, at-rest states of the springs in the case might be at 1,500 cycles per second, unloaded, with full compression at 2,000 cycles, unloaded. Again, the loading is another variable which will affect this and the example of an immovable rock, just noted for the earth-working operating end, of course, also applies here. These numbers, as well as those for the earth-working operating end, as indicated, are merely illustrative. And potential variations can readily be adopted in implementing the specific characteristics desired for a particular tool form.

Turning back to the worm element 74, tooth carrier 76, and related components, the worm element and catchers 100 and 104 can be integrally formed of a standard hardened and tempered steel material such as that supplied by various manufacturers under the designation 4140. The tooth carrier 76, teeth 84 and 86, ramp riders 92 and 98, catcher projections 102 and 106 and guide projections 230 and 232, can also be integrally formed of the same material. However, for ease of formation, each tooth and the ramp rider, catcher projection and guide projection therein can be integrally formed and then rigidly screwed in position onto the tooth carrier 76. Of course a variety of conventional alternatives, both as to the fabrication and the material, can readily be employed.

The structure and operation of the vegetation-cutting apparatus, down the drive train from the parts that have already been focused upon, is readily understood from FIGS. 10–13 and the description applicable thereto which has already been given. The same can be said for the structure and operation of the components of the earth-working tool shown in FIGS. 14 and 15. Nevertheless, in both cases, some additional description is appropriate.

Referring to FIG. 10, and to some extent back to FIG. 5, the spring case 112 at its end down the drive train is connected to the reciprocator arm 118. This connection is through a bolt 306 which is mounted so that its barrel passes through an opening 310 defined at the very tip of the spring case. This connector bolt 306 is firmly connected by a nut 311 so that its barrel passes not only through the spring case connector opening 310 but through an elongated opening 312 formed by the upper end structure of the reciprocator arm 318. Of course, a variety of alternative standard connectors can be used apart from the bolt and nut, which would present the appropriate cylindrical barrel structure through the spring case connector opening and the elongated reciprocator arm opening. The reciprocator arm 118, then, along a lower leg thereof, passes through an arm opening 313 of the reciprocator rocker 120. That arm opening, downward through rocker, as shown in FIG. 10, runs in a direction perpendicular to the axis of the rocker.

The reciprocator arm 18 has upper 314, middle 316 and lower 318 openings therethrough at positions along the length of the lower leg of that arm. The arm is held by the rocker by disposing that leg through the arm opening 312 of the rocker and passing a rocker bolt 320 through an opening along the axis of the rocker and through the desired upper, middle or lower arm opening. The bolt 320 is held firmly in position by screwing it into the internally threaded axial rocker opening.

The choice of the opening through the reciprocator arm for the connection to the rocker 120, of course, adjusts the extent of the back-and-forth linear movement of the reciprocator yoke 122 with the back-and-forth linear movement of the spring case 112. As is apparent, this, also, then adjusts the back-and-forth angle for the rotational oscillation of the blades of the vegetation-cutting operating end 22.

The reciprocator arm 118, at its lower end, has structure providing a lower, elongated arm opening 324. A connector pin 326, having threads on both ends, is then connected to the yoke 122 so that the barrel of the pin is disposed between a pair of ears 330, having openings for the pin, which are formed on the yoke. A pair of nuts 332 are used for this connection. Of course, other conventional arrangements, providing a barrel could readily be employed. The barrel of the pin 326, then, also passes through the lower elongated arm opening 324.

The yoke 122 is slidably mounted in the reciprocator mounting piece 124. A pair of mounting flanges 334, extending along the underside of the mounting piece 124 are used in maintaining the slidable mounting of the yoke 122. The reciprocator arm 118, the rocker 120, the mounting piece 124 and the yoke 122 can conveniently be made of a steel material, for example, the material sold by a variety of manufactures under the general designation 4140. Of course, however, this is merely one of many possible examples.

Figure 11:
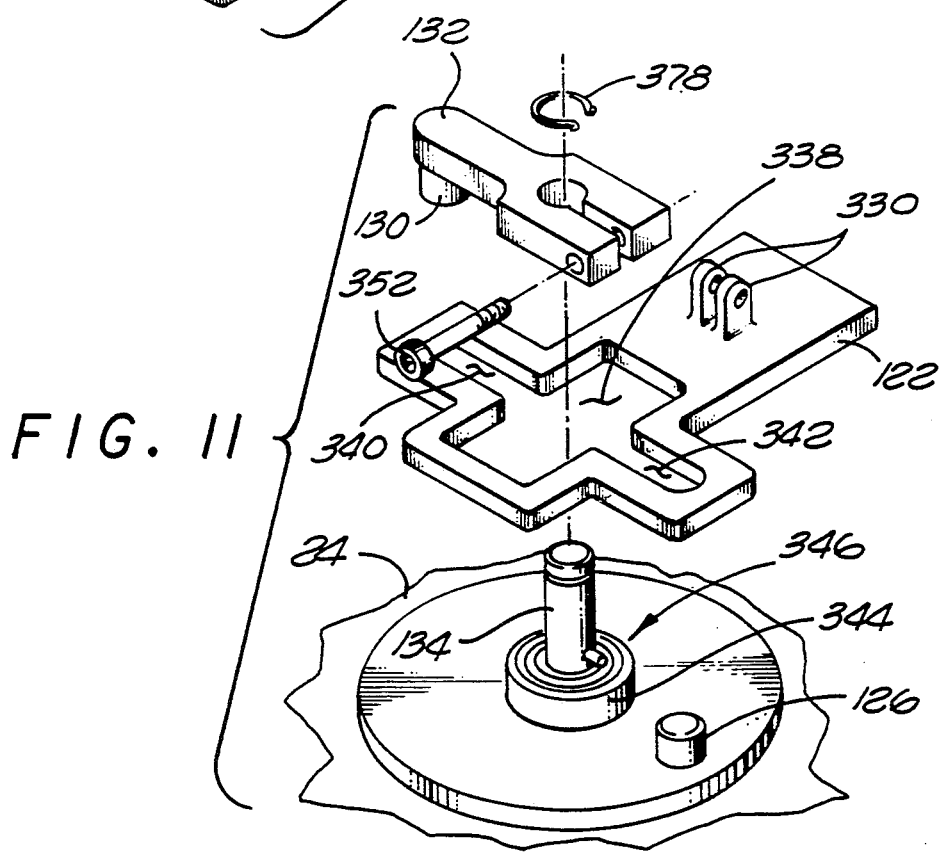
FIG. 11 is an exploded, perspective view, of some of the components of the drive train of the apparatus of FIG. 1, which follow, along the drive train, the components of FIG. 10.
Figure 12:
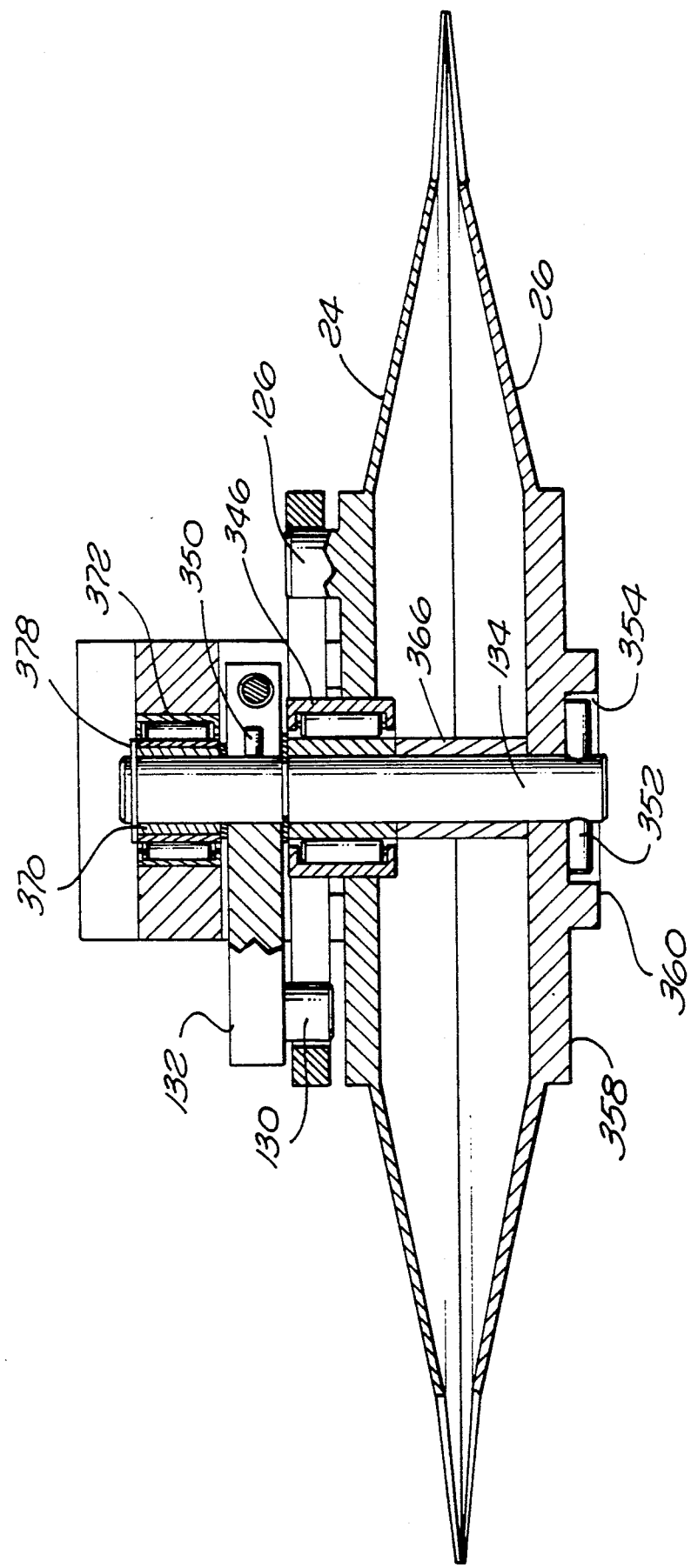
FIG. 12 is a cross-sectional view, broken-away, taken along the line 12—12 of FIG. 1.

Continuing down the drive train, a portion of the reciprocator yoke 122 also appears in FIG. 11. Referring to that figure, the yoke has a generally crossshaped opening 336 having a central portion 338, a link pin portion 340 and a blade pin portion 342. The link pin 130 projecting from the link 132, during the operation of the mechanism, fits in the link pin portion of the opening and moves back-and-forth along the opening. Similarly, the upper blade pin 126 projecting from the upper blade 24 fits in the blade pin portion 342 of the opening, moving back-and-forth along that portion of the opening. Of course, those two portions of the opening are formed to just fit about such pins so as to essentially limit their movement to slidable movement along their lengths as the yoke 122 moves linearly back-and-forth.

During this movement of the yoke, the outer casing 344 for a needle bearing 346 is disposed along the central portion 338 of the yoke opening. That central portion is formed to fit closely about the bearing casing at the ends of such portion as the portion moves back-and-forth along the casing. Thus, both that portion of the opening and the slidable mounting of the yoke in the reciprocator mounting piece 124 restrict the yoke against sideways movement.

Figure 13A:
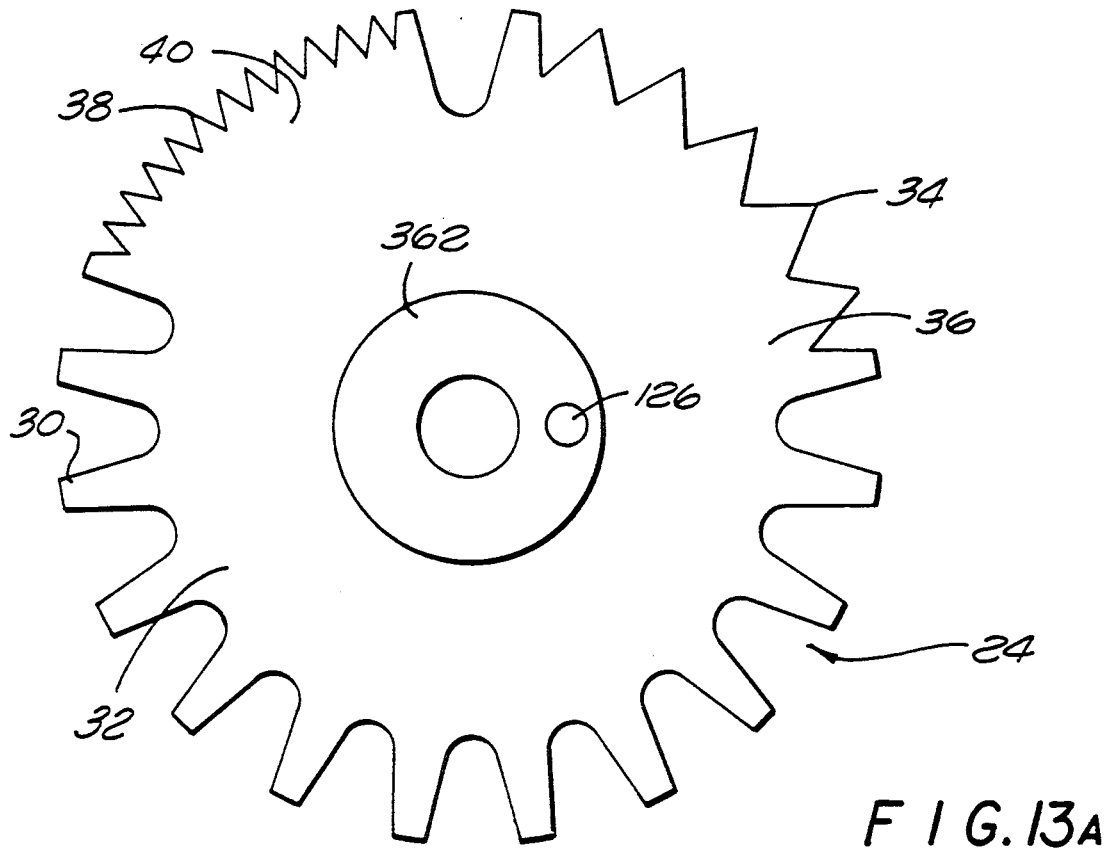
FIG. 13A is a plan view, from above, of the upper blade of the apparatus of FIG. 1.
Figure 13B:
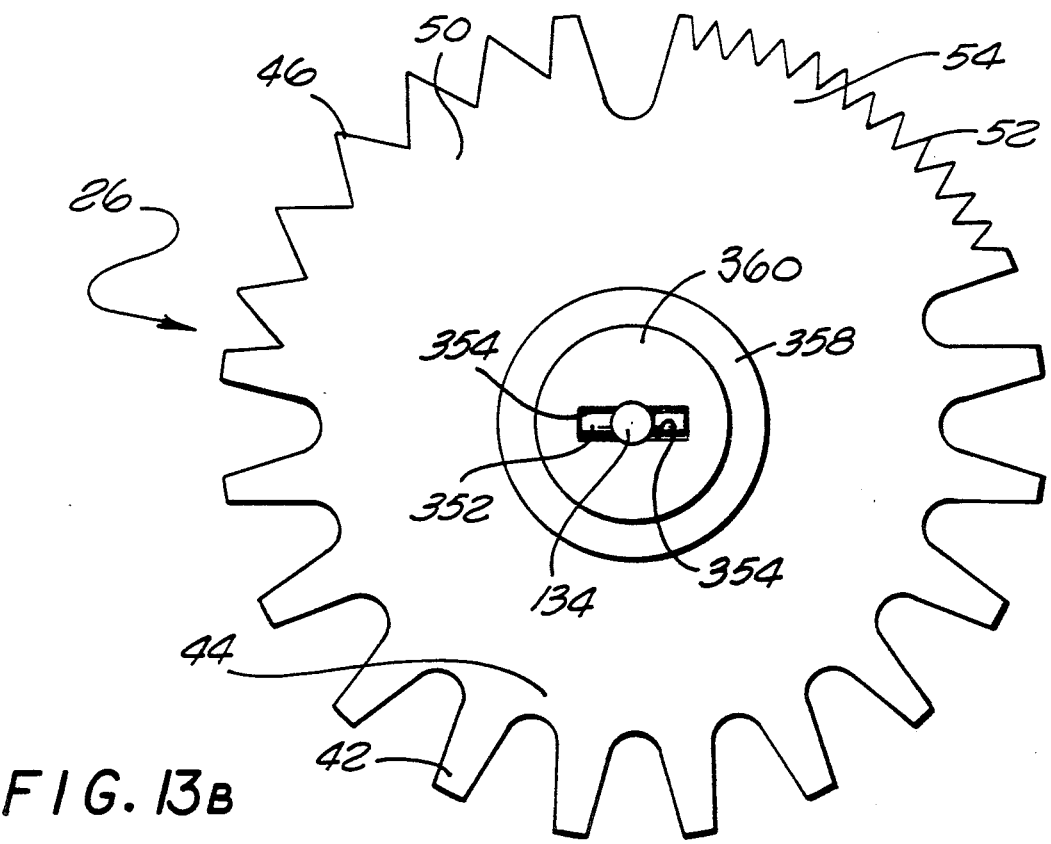
FIG. 13B is a plane view, from below, of the lower blade of the apparatus of FIG. 1.

Referring to FIGS. 11, 12 and 13B, the needle bearing 346 is press-fit along its casing 344 through the center of the upper blade 24. Then the lower blade shaft 134 rotates inside the bearing 346 with the movement of the link pin 130. More specifically, the link pin 130 causes the link 132 to rotationally oscillate about the axis of the shaft. The shaft extends between the forked portion of the link, between wall structure of that portion formed to fit about the shaft. The shaft, also, has mounted thereon, projecting therefrom, an upper shaft pin 350 which fits between a narrow portion of the opening between the forked portion of the link. This and the fit of the fork portion about the shaft cause the shaft to rotationally oscillate with the movement of the link. A link screw 352 passes through one leg of the fork and is screwed into the other leg to assure the tightness of the fit about the shaft 134.

A lower shaft pin 352, extending through the shaft, couples the shaft to the lower blade 26 by extending, at each of its ends, into the elongated ends 354 of an opening 356 extending a small distance upward from the bottom of the lower blade 26. The opening, of course, is at the center of the blade along the thickest part of the blade structure.

The lower blade structure 26 substantially increases in thickness toward its center and then increases even more yet closer to the center. Although in the embodiment shown, this blade structure is integral, these thickened portions, alternatively, can readily be formed by separate pieces mounted on a separate blade—one piece to add the first degree of added thickness and another piece to add the additional degree of thickness The portion having the initial degree of added thickness is shown at 358 in FIGS. 12 and 13B and the portion having still greater thickness is shown at 360. The analogous situation applies for a central portion 362 of the upper blade 24 having substantial added thickness (see FIG. 13A). In fact, in the particular embodiment, the underside of the reciprocator mounting piece 124 rests on that thickened portion 362 as that portion oscillates back-and-forth under and against such underside. Of course, it will be evident that other, alternative arrangements can also be adopted.

Although the upper 24 and lower 26 blades have three different forms of teeth, such blades, of course, could simply have a single form, or more than three forms. Where a single form is used, most typically that form would be a form adapted for low difficulty vegetation. However, the pair of blades having that single tooth form could be replaced with a pair having a single, second tooth form or a pair having a single, third tooth form, et cetera. In the particular embodiments of FIG. 13, there are eleven tooth ends in the high difficulty sets of teeth 38 and 52 and five tooth ends in the intermediate difficulty sets of teeth 34 and 46. In the blade embodiments 24 and 26 shown, and which will typically be the case, the tooth structures slope slightly toward one another when the blades are assembled in their face-to-face position. Similarly, the portions of the blades other than the just-referenced central thickened portions also slope toward one another, such sloped portions thus presenting a somewhat concave shape toward the space between the assembled blades. In operation, the blades might typically oscillate back-and-forth through about 30 degrees of rotation; however, variations for this, depending on the particular desired design characteristics for the vegetation cutting tool, between about ten degrees and 90 degrees might be expected.

Returning to FIG. 12, there is a sleeve 366 that acts as a spacer below the needle bearing 346 that is mounted in the upper blade 24, and above the lower blade 26. And above the link 132, there is another sleeve 370 about the lower blade shaft 134 to the inside of an upper needle bearing 372. The lower shaft 134 fits through an opening 374 through a shelf 376 of the mounting piece 124 (FIG. 10). The upper needle bearing is press-fit in that shelf opening and the upper sleeve is between the bearing and the shaft. The sleeve, of course, could readily be eliminated, with the shaft directly against a smaller-size needle bearing. A retainer piece 378 (of the snap-on type having a circumferential gap) fits in a groove along the outside of the shaft 134, against the top of the upper sleeve 370 and the inside portion of the upper needle bearing 372 to help hold the shaft in position.

Referring to FIG. 14, the cultivator mounting piece 154 has a somewhat different form than the reciprocator mounting piece 124. But its function and interaction with the cultivator arm 146, cultivator rocker 150, and upper 380, middle 382 and lower 384 openings through the lower leg of the cultivator arm are fully analogous to what was described for the vegetation-cutting operating end. And the same applies to the following elements of the earth-working operating end, which have comparable elements with respect to the vegetation-cutting operating end: the bolt 386 for the cultivator rocker 150, threaded into an internally-threaded axial rocker opening; the ears 386 projecting from the cultivator yoke 152; and the pin 390, threaded on either end, to connect the lower end of the reciprocator arm to the reciprocator yoke. Also, the elongated opening 394 through the lower end of the cultivator arm 146, functions as a connector opening at the lower end of the arm in the same manner as the comparable opening through the lower end of the reciprocator arm 118.

The rear part of the cultivator yoke 152, fits above mounting flanges 396 along the lower portion of the cultivator mounting piece 154. And, as with the situation for the vegetation-cutting operating end, the cultivator yoke 152 is confined to linear, back-and-forth movement by the mounting piece 154. However, because of the nature of the earth-working operating end, the front portion of the cultivator yoke 152 is formed differently then the front portion of the reciprocator yoke 122.

Specifically, the front portion first narrows and then extends vertically through the continuation of the centerline of the back portion to provide, with reference to the direction of FIG. 14, an upper elongated opening 396 and a lower elongated opening 398. When in position, as in FIG. 15, the elongation direction for these openings is generally along the length of the housing for the earth-working operating end (as in FIG. 15). The cyclical, back-and-forth movement of the cultivator yoke 152 thus causes the pendulum-like oscillation of the left 156 and right 160 hoeing tines through the left 158 and right 162 connector arms, respectively, which are attached to the inner ends of the left 166 and right 164 rocker shafts, respectively. The oscillation of the two connector arms and, thus, of the two hoeing tines, of course, are directly, i.e., 180 degrees, out-of-phase with one another. Although the connector arms are shown extending through their respective yoke openings without any bushings about such arms in the openings, of course, the use of bushings could, alternatively, readily be adopted. The size of the elongated yoke openings 396 and 398 for the connector arms is closely matched to the size of the circular-shaped legs of the connector arms which extend through such openings, to essentially confine those arms to, with respect to their respective yoke openings, movement back-and-forth along the openings. In the embodiment shown in FIG. 15, the cultivator mounting piece 154 is mounted in the operating end housing, in conventional fashion (mounting components for such not shown). This can be accomplished through brackets, through a base structure below the mounting piece or through a variety of other conventional methods.

The tines 156 and 160 are of a type which are now conventional. The way of fixing them in position, the rocker shafts 164 and 166, and the way of mounting such rocker shafts, are all, also, conventional. And, as is apparent, the parts and description for the left side are analogous to those for the right side. Thus, referring to the right side, there is an inner 396 and an outer 398 bushing about the rocker shaft mounted in the housing. The outer bushing fits into a cavity of a right tine mounting piece 399. A tine retainer piece 400 is tightly against the outside surface of the tine between small flanges projecting from such surface. And a bolt 402 and pair of nuts 404 are used in fixing the tine in position. An O-ring 406 is fitted in the housing against the tine mounting piece 399. And a retainer piece 407 (of the snap-on type having a circumferential gap) helps hold the right rocker shaft 164 in position. As shown at the left, where the rocker shaft cover 166, is in place, there is a cover for each of the rocker shafts. Thus, each rocker shaft rotationally oscillates back-and-forth with its respective tine and connector arm.

Referring back to FIG. 5, as already noted, the extender set of threads 78 and the retractor set of treads 80 each have six threads. And in that embodiment, the pitch spacing, the distance between adjacent threads along the length of the worm element, is uniform along each set of threads, and also the same for the two sets of threads. Also, the pitch angle, the angle measured as the angle away from how the thread would be oriented if it were oriented perpendicular to the axis of rotation 82 for the worm element 74 so as not to push the tooth it would engage, and thus the tooth carrier, in either linear direction, is uniform along each set and of the same size, but opposite in direction, for the extender set and the retractor set. In other embodiments, by way of example, one might find that certain minimal variations associated with the thread adjacent the respective ramp sector 90 or 96 may be useful to permit the applicable tooth 84 or 86 additional room to maneuver with respect to the transitions relating to the ramp riders 92 and 86 and the ramp sectors.

In addition, in the embodiments shown, the worm element and related components are the same for the vegetation-cutting operating end 22 and for the earth-working operating end 172. However, there can be many variations, in accordance with differences which may be desired in design characteristics. Also, there can be many variations for the same general type of apparatus, e.g., vegetation-cutting or earth-working, depending on the characteristics desired. By way of example, for an engine which typically operates at in the range of 10,000 revolutions per minute, unloaded and in the range of 7,500 revolutions per minute loaded, and for a vegetation-cutting operating end of the type shown in FIG. 1, having a desired normal blade operating rate of 800 to 1,200 cycles per minute, one might elect to adopt a worm element having a total number of threads in the range of six to ten, with in the range of three to five extender threads and three to five retractor threads. On the other hand, for the same engine, but for an earth-working operating end having certain specific characteristics, one might decide on a total of four threads with two in each set. In any case, it is readily apparent that the number of threads, in effect, can be used to change the gear reduction ratio between the speed of the engine and the speed of the blades or tines.

On the other hand, if one wanted to maintain the same worm element but change the effective gear reduction, one could, for example, employ a tooth carrier having two separated extender teeth along the tooth carrier and two separated retractor teeth. The respective extender or retractor tooth on the outside would then carry the catcher projection and the one on the inside would carry the ramp rider. In that case, during the extend part of the cycle and the retract part of the cycle, an extender or retractor tooth would not have to move through all of the retractor or extender threads before a transition to the opposite part of the cycle occurred. Thus, there clearly are alternatives to changing worm elements in the event a different effective gear reduction ratio is desired.

Related to what has just been discussed, the fast retract worm element 138, schematically represented in FIG. 16B through the worm element portions having the threads, but with the ramp sectors and ends of the worm element omitted, has six extender threads based on one pitch spacing and pitch angle and three retractor threads based on a greater pitch spacing and greater (and opposite) pitch angle. The idea there, as is evident from the above discussion of this, is to have one effective gear reduction ratio for the extend part of the cycle and half the gear reduction ratio for the retract part of the cycle. Thus, for example, for the earth-working operating end, the tines would return in the retract part of the cycle at twice the speed as in the extend part.

For the fast retract and variant extender thread worm element 140, similarly schematically represented in FIG. 16C, the retract aspect is the same as for the worm element of 16B. Also, the difference in the gear reduction for the extend and retract parts of the cycle is the same as described for 16B as there are still six extend threads. However, the pitch angle along a 60-degree portion of each of the extend threads is greater than for a 300-degree portion of each thread. By way of example, this 60-degree portion (which is continuous) may correspond to the portion of the engine cycle in which the power output of the engine is greatest. Other variations, along these general lines, of course can be made for various desired characteristics and operating properties.

In the deceleration worm element 136, similarly schematically represented in FIG. 16A, the pitch angle design applicable to several threads at the end of each set of threads is less than the pitch angle design applicable to the threads in between. That, of course, is to provide deceleration for the movement of the tooth carrier near the points of transition between the extend and retract parts of its cycle. By selecting the amount of the change in the pitch angle, this can be designed without a change in a desired average pitch angle over each set of threads. For example, if one desires eight threads with an average pitch angle, one could select eight threads having a uniform pitch angle, or, alternatively, have eight threads, not all having the same pitch angle but having the same average pitch angle for the set as a whole.

It has already been emphasized that many changes and variations can be made in the details of the embodiments that have been described, in accordance with the various aspects of the invention. Simply by way of additional example, the guide projections 230 and 232, on the teeth carried by the tooth carrier, could be replaced by alternative guide projections positioned differently and shaped differently, with corresponding changes in the tract sectors 72 and 272 of the halves of the housing 64 for the worm element 74 and related components. Even more substantially, such guide projections could be replaced by alternative guide projections mounted directly on the tooth carrier rather than on the pair of teeth which are carried by the tooth carrier. Also, it might be observed that the tool 22 of FIG. 1, and the blades 22 and 24 thereof, can be used for cutting a variety of matter other than vegetation.

It, thus, will be appreciated by those skilled in the art that many changes and variations may be made, as to detail, in the embodiments which have been described, without departing from the spirit or scope of the invention.

What is claimed is:

1. A tool drive assembly for driving a tool work implement for performing operations on matter external to the tool through movement by the implement, comprising:
   a prime mover;
   a driver shaft;
   first linkage to couple said driver shaft to said prime mover and rotate said driver shaft;
   an implement drive member to incorporate linear movement in response to said rotation of said driver shaft and to impart movement to said work implement through said linear movement;
   second linkage to couple said drive member to said work implement; and
   third linkage to impart said linear movement to said drive member in response to said rotation of said driver shaft, including,
      a worm element to rotate with said driver shaft including a first set of threads angled in a first direction and a second set of threads angled in a second direction, and
      a tooth carrier carrying a first tooth to engage threads of said first set of threads to move said carrier in a first linear direction in response to said rotation of said worm element and a second tooth to engage threads of said second set of threads to move said carrier in a second linear direction in response to said rotation of said worm element, said tooth carrier being operatively connected to said drive member.

2. A drive assembly as defined in claim 1 wherein:
said worm element further includes a first ramp sector and a second ramp sector; and
said tooth carrier further carries a first ramp rider projection to ride said first ramp sector and move said second tooth toward engagement with said second set of threads and a second ramp rider projection to ride said second ramp sector and move said first tooth toward engagement with said first set of threads.

3. A drive assembly as defined in claim 1 wherein:
said tooth carrier further carries a first catcher projection and a second catcher projection; and
said third linkage further includes first and second catchers attached to said worm element, said first catcher to provide a barrier for said first catcher projection toward the extreme of said tooth carrier movement in said second linear direction and said second catcher to provide a barrier for said second catcher projection toward the extreme of said tooth carrier movement in said first linear direction.

4. A drive assembly as defined in claim 3 wherein:
said first catcher includes a generally circumferential first catcher flange to provide a barrier for said first catcher projection toward the extreme of said tooth carrier movement in said second linear direction for transitions to said engagement of said first tooth, and said second catcher includes a generally circumferential second catcher flange to provide a barrier for said second catcher contact projection toward the extreme of said tooth carrier movement in said first linear direction for transitions to said engagement of said second tooth.

5. A drive assembly as defined in claim 3 wherein:
said first catcher includes a generally annular barrier ramp for said first catcher projection toward the extreme of said tooth carrier movement in said second linear direction for transitions to said tooth carrier movement in said first linear direction, and said second catcher includes a generally annular barrier ramp for said second catcher projection toward the extreme of said tooth carrier movement in said first linear direction for transitions to said tooth carrier movement in said second linear direction.

6. A tool drive assembly for driving a tool work implement for performing operations on matter external to the tool through movement by the implement, comprising:
   a prime mover;
   a driver shaft;
   first linkage to couple said driver shaft to said prime mover and rotate said driver shaft;
   an implement drive member to incorporate linear movement in response to said rotation of said driver shaft and to impart movement to said work implement through said linear movement;

second linkage to couple said drive member to said work implement;

third linkage to impart said linear movement to said drive member in response to said rotation of said driver shaft, including, converter linkage including an input connector to rotate with said driver shaft, and an output connector to incorporate linear movement in response to said rotation of said input connector, and clutching linkage to differentiate said linear movement of said output connector and said linear movement of said drive member including a shock-absorbing mechanism to compress and expand with said differentiated movement.

7. A drive assembly as defined in claim 6 wherein said shock-absorbing mechanism includes a first shock-absorbing member to compress with said differentiated movement in a first linear direction and to expand with said differentiated movement in a second linear direction.

8. A drive assembly as defined in claim 7 wherein said shock-absorbing mechanism includes a second shock-absorbing member to compress with said differentiated movement in said second linear direction and to expand with said differentiated movement in said first linear direction.

9. A drive assembly as defined in claim 8 wherein said first and second shock-absorbing members are each springs.

10. A tool comprising:
a prime mover;
a driver shaft;
first linkage to couple said driver shaft to said prime mover and rotate said driver shaft;
a work implement to perform operations on matter external to the tool through movement by said implement;
an implement drive member to incorporate linear movement in response to said rotation of said driver shaft and to impart movement to said work implement through said linear movement;
second linkage to couple said drive member to said work implement; and
third linkage to impart said linear movement to said drive member in response to said rotation of said driver shaft, including,
a worm element to rotate with said driver shaft including a first set of threads angled in a first direction and a second set of threads angled in a second direction, and
a tooth carrier carrying a first tooth to engage threads of said first set of threads to move said carrier in a first linear direction in response to said rotation of said worm element and a second tooth to engage threads of said second set of threads to move said carrier in a second linear direction in response to said rotation of said worm element, said tooth carrier being operatively connected to said drive member.

11. A tool as defined in claim 10 for cutting wherein said work implement to perform operations through movement of said implement comprises a generally circular-shaped cutting blade to perform operations through rotational oscillation.

12. A tool as defined in claim 10 for earth-working wherein said work implement to perform operations through movement of said implement comprises a hoeing tine to perform operations through a pendulum-like oscillation.

13. A tool comprising:
a prime mover;
a driver shaft;
first linkage to couple said driver shaft to said prime mover and rotate said driver shaft;
a work implement to perform operations on matters external to the tool through movement by said implement;
an implement drive member to incorporate linear movement in response to said rotation of said driver shaft and to impart movement to said work implement through said linear movement;
second linkage to couple said drive member to said work implement; and
third linkage to impart said linear movement to said drive member in response to said rotation of said driver shaft, including,
converter linkage including an input connector to rotate with said driver shaft, and an output connector to incorporate linear movement in response to said rotation of said input connector, and
clutching linkage to differentiate said linear movement of said output connector and said linear movement of said drive member including a shock-absorbing mechanism to compress and expand with said differentiated movement.

14. A tool as defined in claim 13 for cutting wherein said work implement to perform operations through movement of said implement comprises a general circular-shaped cutting blade to perform operations through rotational oscillation.

15. A tool as defined in claim 13 for earth-working wherein said work implement to perform operations through movement of said implement comprises a hoeing tine to perform operations through a pendulum-like oscillation.

16. Drive linkage for a tool to impart linear movement to a drive member in response to rotation of a shaft, comprising:
a worm element to rotate with said shaft including a first set of threads angled in a first direction and a second set of threads angled in a second direction; and
a tooth carrier carrying a first tooth to engage threads of said first set of threads to move said carrier in a first linear direction in response to said rotation of said worm element and a second tooth to engage threads of said second set of threads to move said carrier in a second linear direction in response to said rotation of said worm element, said tooth carrier being operatively connected to said drive member.

17. Drive linkage as defined in clam 16 wherein the pitch spacing for said first set of threads is different than the pitch spacing for said second set of threads.

18. Drive linkage as defined in claim 16 wherein the size of the pitch angle for said first set of threads is different than the size of the pitch angle for said second set of threads.

19. Drive linkage as defined in claim 16 wherein said first set of threads has a plurality of pitch spacings.

20. Drive linkage as defined in claim 16 wherein said first set of threads has a plurality of pitch angles.

21. Drive linkage as defined in claim 16 wherein said first set first set of threads has a cyclical series of pitch angle changes having a cycle of 360 degrees of rotation.

22. A tool for cutting as defined in claim 11 wherein said generally circular-shaped cutting blade includes a first set of teeth having a first tooth form along a first portion of said blade, and a second set of teeth having a second tooth form along a second portion of said blade.

23. A tool for cutting as defined in claim 14 wherein said generally circular-shaped cutting blade includes a firt set of teeth having a first tooth form along a first portion of said blade, and a second set of teeth having a second tooth form along a second portion of said blade.

* * * * *